United States Patent
Pickard et al.

(10) Patent No.: US 12,302,137 B2
(45) Date of Patent: May 13, 2025

(54) MONITORING, ANALYZING AND GENERATING RADIO FREQUENCY (RF) ENVIRONMENTS UTILIZING DISTRIBUTED DEVICES

(71) Applicant: VIAVI SOLUTIONS INC., San Jose, CA (US)

(72) Inventors: Mark William Pickard, Powell, OH (US); Marvin John Rozner, Wichita, KS (US); Andrew Bryan Reynolds, Las Vegas, NV (US); Steven Allen Chisham, Wichita, KS (US); Steve John Joseph Bernier, Quebec (CA)

(73) Assignee: VIAVI SOLUTIONS INC., Chandler, AZ (US)

( * ) Notice: Subject to any disclaimer, the term of this patent is extended or adjusted under 35 U.S.C. 154(b) by 618 days.

(21) Appl. No.: 17/589,435

(22) Filed: Jan. 31, 2022

(65) Prior Publication Data
US 2022/0248241 A1    Aug. 4, 2022

Related U.S. Application Data

(60) Provisional application No. 63/143,475, filed on Jan. 29, 2021.

(51) Int. Cl.
*H04W 24/00*    (2009.01)
*H04W 24/08*    (2009.01)

(52) U.S. Cl.
CPC .................................. *H04W 24/08* (2013.01)

(58) Field of Classification Search
None
See application file for complete search history.

(56) References Cited

U.S. PATENT DOCUMENTS

| | | | | |
|---|---|---|---|---|
| 6,529,547 | B1 * | 3/2003 | Alexander | ............. H04B 17/29 |
| | | | | 375/220 |
| 2014/0163940 | A1 | 6/2014 | Erisman et al. | |
| 2020/0053574 | A1 * | 2/2020 | Hasan | ................. H04W 16/225 |

OTHER PUBLICATIONS

NPL2 (Broadband Signal Analyzers and Generators CS9000 Instrument Family, 2012).*
NPL (Configuring an RF Record and Playback System from General Purpose RF Instrumentation, 2009).*
Hall et al., "Configuring an RF Record and Playback System from General Purpose RF Instrumentation", GNSS 2009, Sep. 25, 2009, pp. 1932-1936.
Viavi Solutions, "Brochure VIAVI Ranger Vector Signal Analyzer and Generator", Dec. 1, 2020, 8 pages. Retrieved from the Internet on Jun. 17, 2022. <https://www.viavisolutions.com/en-us/literature/ranger-vector-signal-analyzer-and-generator-brochures-en.pdf>.

* cited by examiner

*Primary Examiner* — Abdelillah Elmejjarmi
(74) *Attorney, Agent, or Firm* — Mannava & Kang, P.C.

(57) ABSTRACT

According to examples, a system for monitoring, analyzing and generating radio frequency (RF) environments utilizing distributed devices. RF signals from an RF environment are captured. The signals may be analyzed for measuring and testing. Also, an alternate RF environment may be generated based on the captured RF signals or based on previously stored waveforms.

20 Claims, 13 Drawing Sheets

370

PLAYER 1 CONTROLS AND SETTINGS PANEL 371

TRANSCEIVER: CONNECTED
☐ 1
5000000008-10.200.120.163 ▼

FREQ 412.60750 MHz  LEVEL 0.0 dB
PORT RF OUT ▼

Standard_Demo_Waveform_Set
DATA SAMPLE RATE 125.0 MHz
TRIGGER INTERNAL ▼  MODE CONTINUOUS ▼
▷ IDLE

PLAYER 2 CONTROLS AND SETTINGS PANEL 372

TRANSCEIVER: NOT CONNECTED
☐ 2
▼                                    ✕

FREQ 500.0 MHz  LEVEL 0.0 dB
PORT ▼

DATA SAMPLE RATE 250.0 MHz
TRIGGER INTERNAL ▼  MODE CONTINUOUS ▼
▷ IDLE

*FIG. 3C*

MONITORING, ANALYZING AND GENERATING RADIO FREQUENCY (RF) ENVIRONMENTS UTILIZING DISTRIBUTED DEVICES

CROSS REFERENCE TO RELATED APPLICATIONS

This patent application claims the benefit under 35 U.S.C. § 119 (e) of U.S. Provisional Patent Application No. 63/143,475, filed Jan. 29, 2021, the disclosure of which is hereby incorporated by reference in its entirety.

TECHNICAL FIELD

This patent application relates generally to monitoring, analyzing and generating radio frequency (RF) environments utilizing distributed devices, and more specifically, to systems and methods for monitoring RF signals native to an RF environment, analyzing the native signals to determine a characteristic associated the RF environment, generating an alternative RF environment including RF signals according to the determined characteristic, and transmitting the generated RF signals for the alternate RF environment to one or more devices.

BACKGROUND

The utility of radio communication has led to a proliferation of radio networks and devices. To facilitate communication over these radio networks, portions of the electromagnetic spectrum (EMS) have been carved out (i.e., "bands") to enable operators to broadcast within their allocated portion. In many cases, testing of radio communication systems and devices includes testing for various payloads (e.g., analog payloads, digital payloads) over various ranges of RF bands. However, it is often difficult to conduct testing of communication systems that effectively test for varying conditions that can hinder RF communications in the relevant RF bands.

BRIEF DESCRIPTION OF DRAWINGS

Features of the present disclosure are illustrated by way of example and not limited in the following figures, in which like numerals indicate like elements. One skilled in the art will readily recognize from the following that alternative examples of the structures and methods illustrated in the figures can be employed without departing from the principles described herein.

FIGS. 3A-D show user interfaces that can be generated by the signal workshop software application or a sequencer software application, according to examples.

DETAILED DESCRIPTION

Figure 1A:
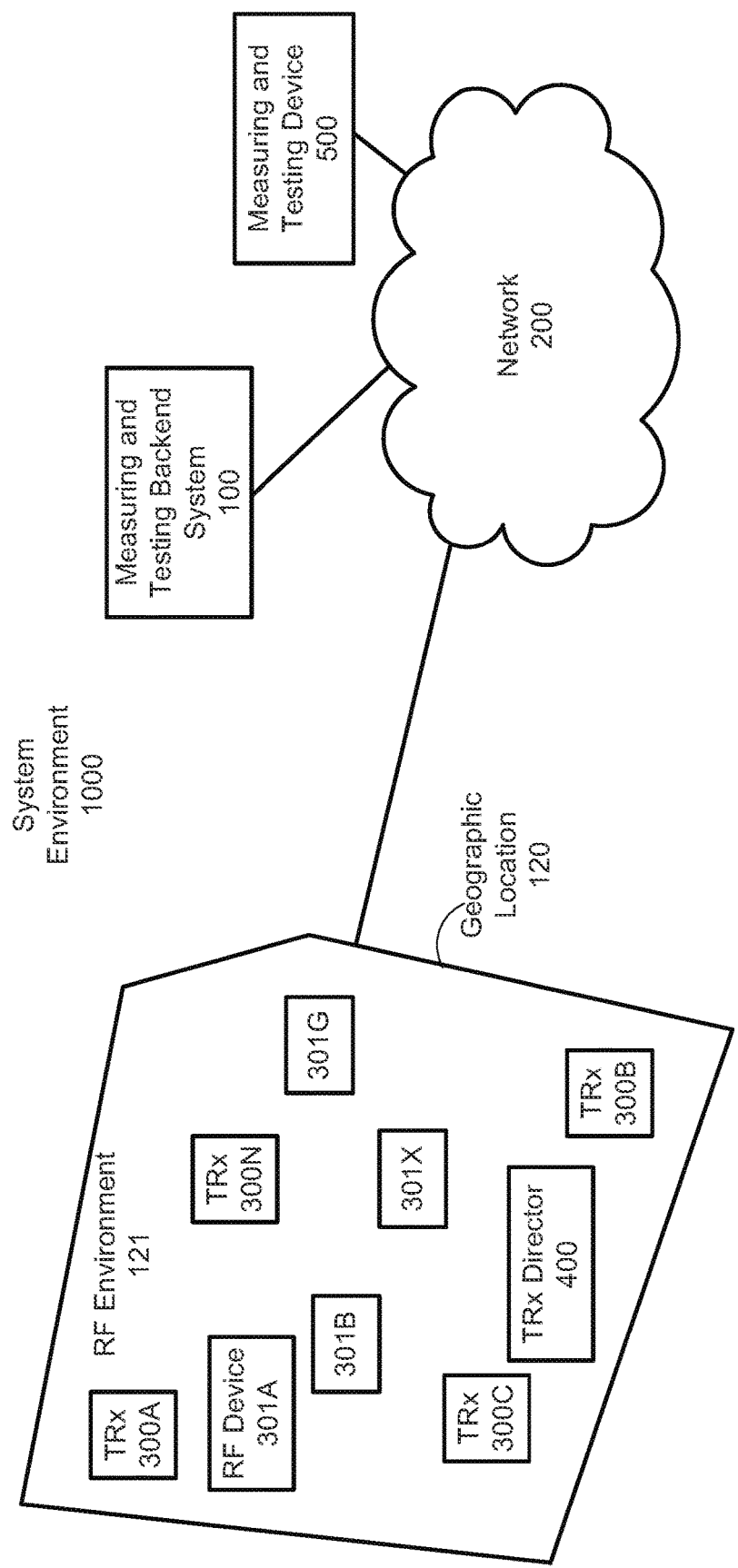
FIG. 1A illustrates a block diagram of a system environment, including RF environment measuring and testing devices, referred to as TRx's, and an RF environment measuring and testing director device, referred to as a TRx Director, that may be implemented for monitoring, analyzing and generating RF environments utilizing distributed devices, according to an example.

For simplicity and illustrative purposes, the present application is described by referring mainly to examples thereof. In the following description, numerous specific details are set forth in order to provide a thorough understanding of the present application. It will be readily apparent, however, that the present application may be practiced without limitation to these specific details. In other instances, some methods and structures readily understood by one of ordinary skill in the art have not been described in detail so as not to unnecessarily obscure the present application. As used herein, the terms "a" and "an" are intended to denote at least one of a particular element, the term "includes" means includes but not limited to, the term "including" means including but not limited to, and the term "based on" means based at least in part on.

System and methods described herein, according to examples of the present disclosure, may, among other things, receive, analyze, generate and transmit RF signals associated with an RF environment. In some examples, the systems and methods may monitor and record RF signals native to an RF environment, and analyze the RF signals to determine one or more characteristics associated with the RF environment for testing. Also, the systems and methods can generate an alternate RF environment. The alternate RF environment is a synthesized RF environment that may be generated based on captured RF signals in the real RF environment. For example, signals may be generated and transmitted to generate an alternative RF environment, which may be used for testing in varying conditions or for other uses. In an example, the signals generated for the alternative RF environment (i.e., alternate RF signals) may be determined from one or more characteristics of the captured RF signals, and transmitted (i.e., playback) to generate the alternate RF environment.

The systems and methods may include a plurality of distributed RF devices which, alone or in combination, may provide capturing, analysis, generation, and transmission of RF signals associated with a radio signal environment. In these examples, the plurality of distributed devices may cooperatively coordinate aspects and functionalities, thereby providing an integrated solution to provide an alternate RF environment for testing and/or simulation purposes.

As will be discussed, in some examples, to generate the alternate RF environment, the system and methods may synthesize RF signals that may attenuate or augment native RF signals that were captured in the real RF environment. The systems and methods may generate the alternate RF environment for a number of example objectives. In a first example, the systems and methods may be deployed to test waveform performance. In a second example, the systems and methods may be deployed to distinguish between actual RF traffic and replayed RF traffic. In a third example, the systems and methods may be deployed to test RF components of a system under synthesized RF environments, including testing for interference or other possible conflicts in alternate RF environments. It should be appreciated that the systems and methods may incorporate various mathematical and modeling techniques, including one or more of machine learning, artificial intelligence and heuristics techniques.

The systems and methods according to the examples of the present disclosure provide a number of technical benefits over existing testing of communication systems. Typically, performance and reliability of radio communication systems and devices may be tested according to various aspects. For example, in many cases, testing of radio communication systems and devices may require testing of performance and reliability in both design and field settings. In such cases, a first aspect of testing may include receiving and capturing of radio frequency (RF) signals from a native environment. Also, testing performance and reliability of radio systems and devices may include analyzing captured RF signals to determine one or more characteristics. In some examples, the one or more characteristics may relate to total usage for a network or device, interference, etc. In many instances, conventional testing systems may provide analysis of captured RF signals, but may not provide generation of an alternate RF environment. Consequently, conventional systems that do not generate an alternate RF environment cannot provide for testing in alternate RF environments, such as testing for interference or other possible conflicts in alternate RF environments that may simulate different conditions under which communications may occur. Also, according to an example of the present disclosure, the monitoring and capturing may be directed to capture a snapshot of a RF environment, and may be for the purpose of re-creating the entire environment at an alternate time or geographic location. Also, the monitoring and capturing may be directed to a particular RF band or geographic location.

Figure 1B:
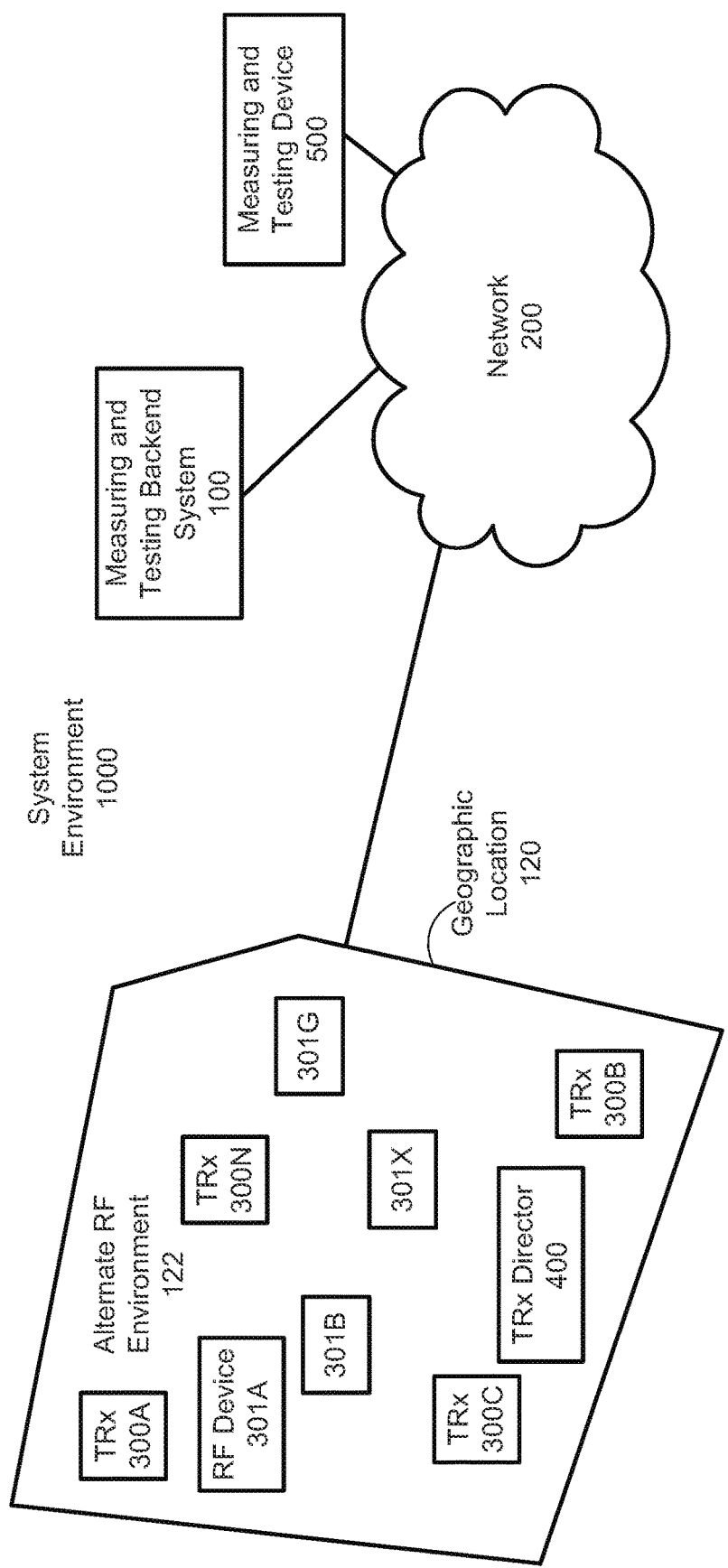
FIG. 1B illustrates a block diagram of the system environment, where an alternate RF environment is generated, according to an example.
Figure 1C:
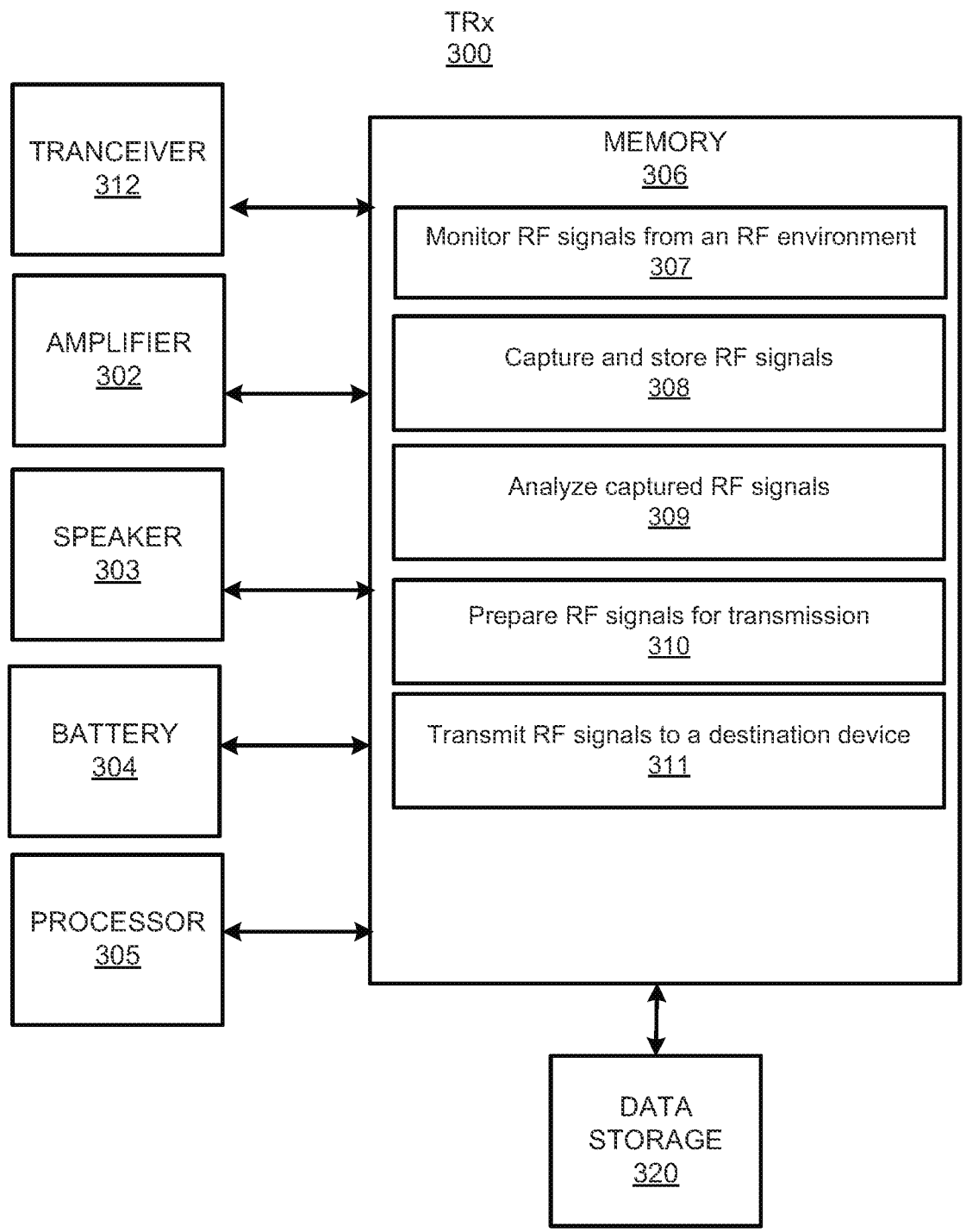
FIG. 1C illustrates a block diagram of a TRx, according to an example.
Figure 1D:
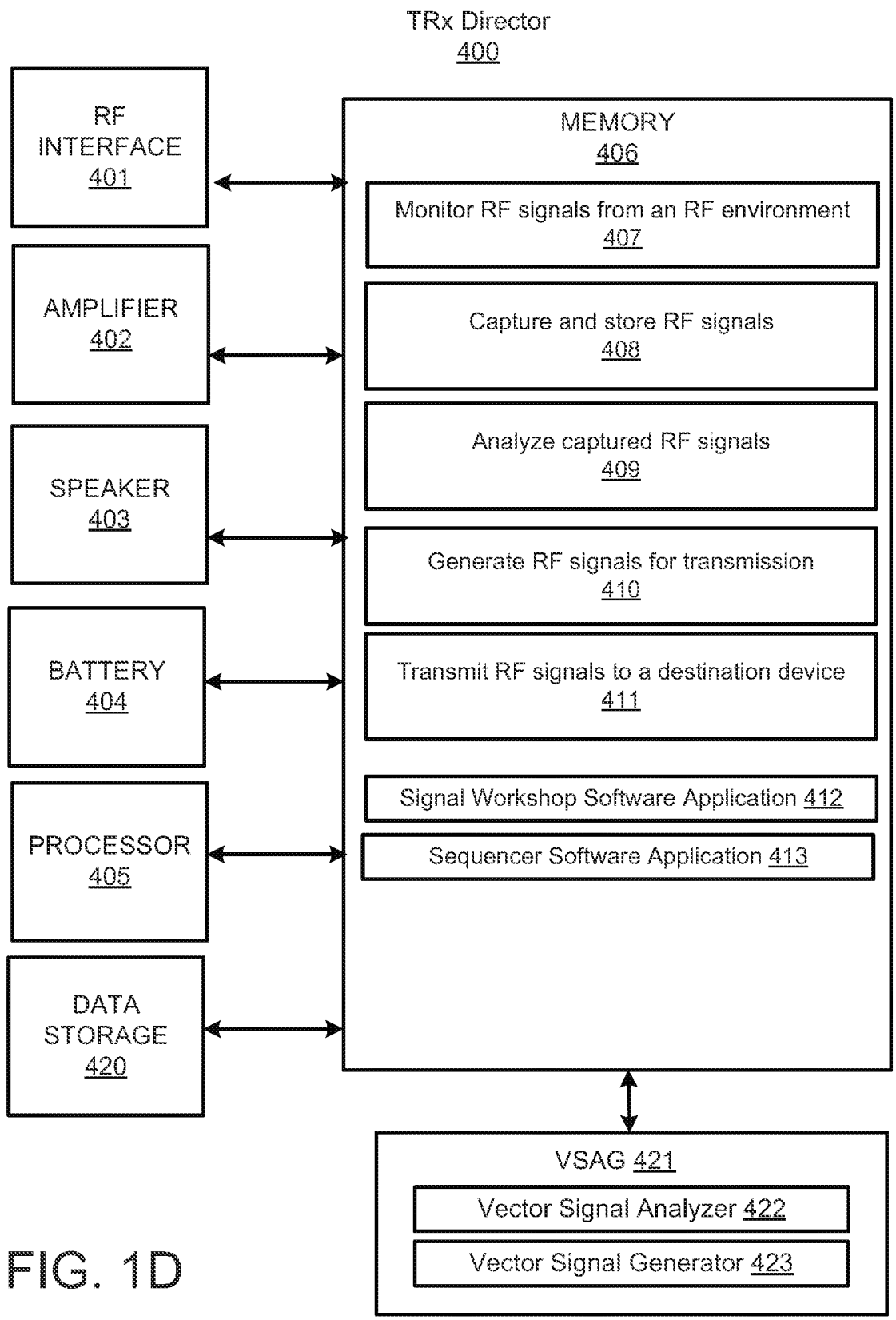
FIG. 1D illustrates a block diagram of the TRx Director, according to an example.
Figure 1E:
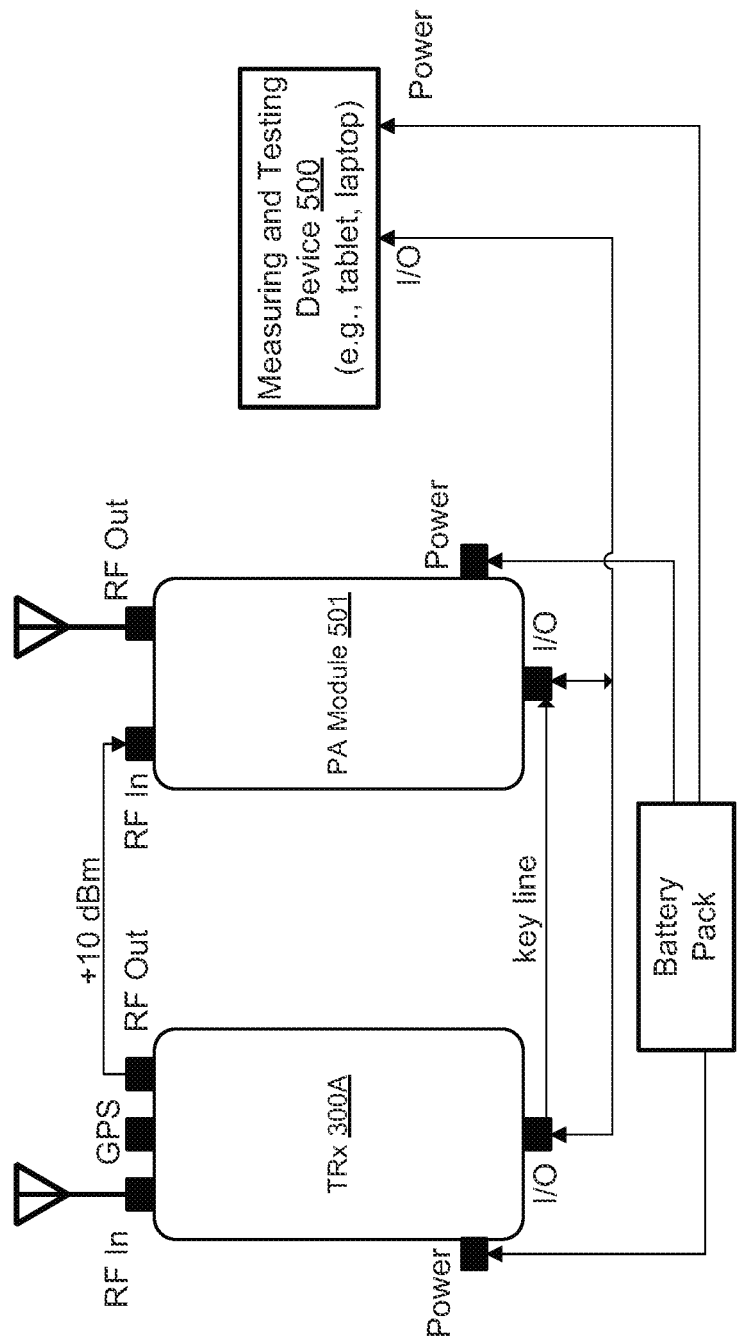
FIG. 1E illustrates a block diagram of a TRx and power amplifier connected to a device, according to an example.

FIGS. 1A-B illustrate systems and devices for measuring and testing an RF environment and for generating an alternate RF environment, according to examples of the present disclosure. In particular, FIG. 1A shows an RF environment that may be measured and tested, and FIG. 1B shows an alternate RF environment that may be generated. FIG. 1C illustrates a block diagram of an RF environment measuring and testing device (TRx), and FIG. 1D illustrates a block diagram of RF environment measuring and testing director device (TRx Director), both of which may be implemented to monitor, analyze, test RF environments and generate alternate RF environments according to examples of the present disclosure. FIG. 1E illustrates TRx measuring and testing devices that may be connected to a tablet or other device to perform various operations.

FIG. 1A shows an RF environment 121 that includes RF signals captured for a particular geographic location 120. The geographic location 120 is a geographic area, which may include several square miles. The RF signals may be captured for a particular period of time, referred to as a snapshot, to determine a snapshot of the RF environment 121 in the geographic location 120. The RF signals may be generated by any devices that can transmit RF signals in the geographic location 120. For example, RF devices 301A-X are shown that may transmit and/or receive RF signals in the geographic location 120. Examples may include radios, cellular phones or any communication equipment that can transmit RF signals in the geographic location 120. The RF devices 301A-X may include devices under test and may include any number of RF devices in the geographic location 120. FIG. 1A also shows TRx's, shown as TRx's 300A-N, and TRx Director 400 in the RF environment 121. These devices may be used to measure and test the RF environment 121 and to generate an alternate RF environment 122 shown in FIG. 1B, according to examples of the present disclosure, as is further discussed below. The RF environment 121 may include any number of TRx's. Also, more than one TRx Director may be used.

One or more of TRx's 300A-N and TRx Director 400 may be connected to measuring and testing backend system 100 and/or measuring and testing device 500 via network 200 to perform various measuring and testing and RF environment generation operations. In some examples, the measuring and testing backend system 100 may include any number of servers, hosts, systems, and/or databases that store data to be accessed by the TRx's 300A-N, the TRx Director 400, the measuring and testing device 500, and/or other network elements (not shown) in the system environment 1000. In addition, in some examples, the servers, hosts, systems, and/or databases of the measuring and testing backend system 100 may include one or more storage mediums storing any data. In some examples, and as will be discussed further below, the measuring and testing backend system 100 may store information that may relate to receiving, analyzing, generating and deploying alternate RF environments utilizing distributed devices. In one example, the measuring and testing backend system 100 may be accessed by the TRx's 300A-N and/or the TRx Director 400 to provide a library of recordings and waveforms for use in generating the alternate RF environment 122. A waveform is a digital representation of an RF signal, and the waveform may be created by sampling an RF signal using a vector signal transceiver. A waveform can be stored as a file. The measuring and testing device 500 may be portable computer, tablet, cell phone, etc. that may receive information concerning the captured RF environment 121 and analyze and display information pertaining to the RF environment 121. It should be understood that in an example, the TRx's 300A-N and TRx Director 400 do not need the measuring and testing backend system 100 and/or the measuring and testing device 500 to perform the operations described herein according to examples of the present disclosure, and the measuring and testing backend system 100 and/or the measuring and testing device 500 can be excluded from the system environment 1000 in an example. Similarly, the network 200 may or may not be used in the system environment 1000.

The system environment 1000 may also include the network 200. In operation, one or more of the measuring and testing backend system 100, the TRx's 300A-N, the TRx Director 400, and the measuring and testing device 500 may communicate with one or more of the other devices via the network 200. The network 200 may be a local area network (LAN), a wide area network (WAN), the Internet, a cellular network, a cable network, a satellite network, or other network that facilitates communication between these devices and systems. The network 200 may further include one, or any number, of the exemplary types of networks mentioned above operating as a stand-alone network or in cooperation with each other. For example, the network 200 may utilize one or more protocols of one or more clients or servers to which they are communicatively coupled. The network 200 may facilitate transmission of data according to a transmission protocol of any of the devices and/or systems in the network 200. Although the network 200 is depicted as a single network in the system environment 1000 of FIG. 1A, it should be appreciated that, in some examples, the network 200 may include a plurality of interconnected networks as well.

As will be described below, TRx's 300A-N and TRx Director 400 and optionally measuring and testing backend system 100 and/or measuring and testing device 500 can perform various measuring and testing and RF environment generation operation, including, among other things, monitor, analyze, generate and deploy RF environments. It should be appreciated that one or more of these devices and systems may or may not include additional features and some of the features described herein may be removed and/or modified without departing from the operations described herein.

Furthermore, while the servers, systems, subsystems, and/or other computing devices shown in FIGS. 1A-D may be shown as single components or elements, it should be appreciated that one of ordinary skill in the art would recognize that these single components or elements may represent multiple components or elements, and that these components or elements may be connected via one or more networks. Other types of servers, middleware, systems, platforms, and applications not shown may also be provided at the front-end or back-end to facilitate the features and functionalities described herein.

TRx's 300A-N may be any device configured to transmit and/or receive data and perform recording operations to capture RF signals in the RF environment 121 and perform playback operations to transmit RF signals and to generate alternate RF environment 122 shown in FIG. 1B. In an example, each of the TRx's 300A-N may be portable mobile devices utilized to, among other things, capture, analyze and transmit RF signals associated with an RF environment. In an example, a TRx 300 may embody a small(er) form factor, such as a handheld radio device, and may function as a component device in a system of distributed devices. In part due to their smaller form factor, the TRx's 300A-N may be placed at different locations within the geographic area of the geographic location 120 to facilitate monitoring, generating and transmitting of RF signals for various purposes. Also, the TRx Director may be placed at a different location than the locations of the TRx's 300A-N within the geographic area of the geographic location 120. In some examples, the TRx's 300A-N may be utilized to monitor and stress test a radio network. In other examples, the TRx's 300A-N may be utilized to monitor and record RF signals and to generate (i.e., synthesize) an alternate RF environment.

FIG. 1C shows an example of a TRx 300, which may be used for any of the TRx's 300A-N. TRx 300 may include, among other things, a transceiver 312, an amplifier 302, speaker 303, battery 304, processor 305, memory 306 and data storage 320. The transceiver 312 may be a device component including an RF transmitter and an RF receiver that may transmit and receive RF signals, including receiving RF signals that may be communicated in the RF environment by RF devices 301A-X, any of the other TRx's 300A-N and the TRx Director 400, and transmitting RF signals or alternate RF signals in the RF environment. The transceiver 312 may be connected to a vector signal transmitter as is further discussed below to enable capturing RF signals and generating RF signals for transmission. The amplifier 302 may be a device component that may increase power (db) of a signal, such as an RF signal. The speaker 303 may be a device component that may convert a signal, such as an RF signal into a corresponding sound. The battery 304 may be a device component that may supply electrical power to power electrical devices, such as TRx's 300A-N. Data storage 320 may include a solid-state drive, hard drive, or other type of data storage device that can store a library of captured recordings and waveforms. The TRx 300 may include a software defined radio as is further described below. The TRx 300 may include a vector signal generator (not shown) to generate RF signals from digital waveforms stored in the data storage 320. The TRx 300 may use any antenna that is suitable for receiving and transmitting RF signals. Also, the TRx 300 may include power amplifier options that allow for high-power transmission. The power amplifier options may include power amplifier modules that can be connected to the TRx 300 to meet transmission requirements. Also, the TRx may include a GPS receiver to determine location and time, such as UTC. The TRx 300 may be connectable to another device, such as a laptop or tablet or the TRx Director 400, that can execute software for analyzing captured RF signals.

In some examples, the processor 305 may execute the machine-readable instructions stored in the memory 306. It should be appreciated that the processor 305 may be a semiconductor-based microprocessor, a central processing unit (CPU), an application specific integrated circuit (ASIC), a field-programmable gate array (FPGA), and/or other suitable hardware device.

In some examples, the memory 306 may have stored thereon machine-readable instructions (which may also be termed computer-readable instructions) that the processor 305 may execute. The memory 306 may be an electronic, magnetic, optical, or other physical storage device that contains or stores executable instructions. The memory 306 may be, for example, Random Access memory (RAM), an Electrically Erasable Programmable Read-Only Memory (EEPROM), a storage device, an optical disc, or the like. The memory 306, which may also be referred to as a computer-readable storage medium, may be a non-transitory machine-readable storage medium, where the term "non-transitory" does not encompass transitory propagating signals. It should be appreciated that the memory 306 depicted in FIG. 1C may be provided as an example. Thus, the memory 306 may or may not include additional features, and some of the features described herein may be removed and/or modified without departing from the scope of the memory 306 outlined herein. It should be appreciated that, and as described further below, the processing performed via the instructions on the memory 306 may or may not be performed, in part or in total, with the aid of other information and data, such as information and data provided by the measuring and testing backend system 100 and/or measuring and testing device 500.

The TRx 300 may include signal capture and signal playback software comprising instructions stored in the memory 306 and executed by the processor 305. Instructions 307-311 show examples of instructions that may be included in the signal capture and signal playback software. The memory 306 may store instructions, which when executed by the processor 305, may cause the processor to: monitor 307 RF signals from an RF environment; capture 308 RF signals; and analyze 309 captured RF signals to determine an associated characteristic. In addition, the instructions, when executed by the processor 305, may further cause the processor to prepare 310 RF signals for transmission and transmit 311 RF signals. In some examples, and as discussed further below, the instructions 307-311 on the memory 306 may be executed alone or in combination by the processor 305 to monitor, analyze, generate and transmit RF signals associated with one or more RF environments utilizing distributed devices.

In some examples, the instructions 307 may monitor (i.e., receive) RF signals emitting in the RF environment 121. In some examples, the instructions 307 may specifically monitor (or "look") for signals of interest or for interference signals. In this manner, the TRx 300 may function as a "sensor" operating in surrounding RF environment 121. In one example, the instructions 307 may monitor RF signals received via the transceiver 312. The instructions 308 may capture and store RF signals associated with the RF environment 121 via the transceiver 312. The TRx 300 may store parameters that specify the types of signals to capture and store. The parameters may include frequency range, power level, sampling rate, etc. Also, the parameters may specify a time period to capture the RF signals. The captured RF signals are sampled and stored as waveforms, which include digital waveform files of the sampled RF signals. The TRx Director 400 may send instructions to the TRx's 300A-N that specify the parameters for signal capture and may send instructions to the TRx's 300A-N that specify the parameters for signal playback to create the alternate RF environment 122 as is further discussed below. The waveforms of the captured RF signals may be transmitted to the TRx Director 400 for further analysis and for modification to generate alternate RF signals. Also, the waveforms of the captured RF signals may be stored and replayed at a different time. Playback of the At 309, the instructions 309 may analyze RF signals, such as the RF signals captured via the instructions 308, according to one or more criteria. Moreover, the instructions 309 may analyze the RF signals to determine one or more characteristics associated with an RF environment, such as characteristics related to congestion, interference, payloads, etc.

In one example, the instructions 309 may transmit the RF signals to another device, such as the TRx Director 400, for analysis. In another example, the RF signals captured at a TRx 300 may be generated for transmission and broadcast at a second TRx. So, in this example, the RF signals captured at a first TRx and transmitted from a second TRx may be utilized to determine a difference between actual radio traffic and replayed radio traffic.

The instructions 310 may access a library of recordings and waveforms from the data storage 320. That is, the instructions 310 may access the previously loaded waveforms for transmission to another device to generate alternate RF environment 122. In an example, the library of waveforms may be accessed from an external system, such as the backend system 100 or from the TRx Director 400. In other examples, the instructions 310 may modify captured RF signals to generate (i.e., synthesize) alternate RF signals. The generation of the alternate RF signals may be based on an associated characteristic, such as frequency, power, etc. Also, waveforms for generating the alternate RF signals may be generated by the TRx Director 400 and transmitted to the TRx 300 for playback. One or more characteristics of captured RF signals (e.g., frequency, power, etc.) may be modified to create alternate RF signals. In one example, in order to test network performance and reliability, a total payload associated with captured RF signals may be augmented and played back to provide a denser radio signal environment.

The instructions 311 may transmit RF signals associated with an RF environment (e.g., playback) in the RF environment to generate an alternate RF environment. So, in one example, the transmitted RF signals may be utilized to increase signal densities or clutter in an RF environment. This may be done for testing purposes or for creating a spoofed RF environment that obfuscates a real RF environment. In an example, the transmitted RF signals may be provided by a system testing device (e.g., TRx Director 400) for transmission by TRx's 300A-N to create the alternate RF environment 122. In this example, TRx's 300A-N may be placed in particular locations to, for example, simulate high-payload conditions.

Playback of RF signals from stored waveforms may be automated or manually controlled in the TRx 300. Playback may be triggered by instructions sent from the TRx Director 400 or another device or playback may be manually controlled. Also, capturing of RF signals may be automated or manually controlled.

Although not shown, the TRx 300 may include one or more components of vector signal recorder, analyzer and generator 421, referred to as VSAG 421 and is shown in FIG. 1D, to capture and store RF signals as waveforms and to generate RF signals from waveforms. In an example, the transceiver 312 may additionally include a vector signal transceiver for the VSAG 421. The vector signal transceiver for example includes analog to digital converters to perform RF sampling to digitize an RF signal to generate waveforms. Also, the vector signal transceiver includes RF digital to analog converters to generate RF signals from waveforms. Also, the TRx 300 may include software that allows it to automatically generate RF signals from stored waveforms and allows it to automatically capture RF signals. Also, the TRx 300 may be connected to a device, such as a laptop or tablet that executes software for analyzing RF signals and for controlling playback of waveforms. Also, the TRx 300 may operate as an audio transmitter whereby an audio file, e.g., MP3 file, may be selected and transmitted based on user-defined modulation parameters. The operator can set transmission parameters such as frequency and power and modulation type and modulation parameters and squelch. Also, the TRx 300 may operate in a push to talk mode whereby audio is captured by a microphone (not shown) and transmitted, and received signals are demodulated and played back on the speaker 303.

FIG. 1D shows an example of the TRx Director 400. The TRx Director 400 may be an electronic or computing device configured to transmit and/or receive data, and may be communicatively coupled to the network 200 to interact with various elements, such as one or more of TRx's 300A-N, measuring and testing backend system 100 and measuring and testing device 500. As will be discussed below, in some examples, the TRx Director 400 may be configured to monitor, capture, generate (e.g., synthesize) and transmit RF signals, including alternate RF signals to generate the alternate RF environment 122. For example, the TRx Director 400 can be used to record the EMS and other signals, and can create a library of environments for multiple training and operational domains. Recordings of cell site installations, command post environments, and convoy or troop movement activities are some examples of the recording types that can be recorded by the TRx Director 400. Moreover, the TRx Director 400 may be fully-featured, in that it may enable testing of waveforms performance in all cycles of design and deployment. Specifically, the TRx Director 400 may include an ability monitor, capture, generate (i.e., synthesize) and transmit RF signals for an RF environment to determine an RF network's ability operate in benign or highly congested/contested RF environments.

In an example, the TRx Director 400 and the TRx's 300A-N work together to monitor, record and playback complex RF environments and signal sets. For example, the TRx's 300A-N can replay recordings, e.g., waveforms, captured by the TRx Director 400 or synthetic waveforms created by the TRx Director 400 remotely away from the TRx's 300A-N to test equipment and generate alternate RF environments which may be used for training or other purposes. Also, the TRx's 300A-N have the ability to monitor and record the EMS without having an operator be present and can be triggered to capture and playback RF signals based on instructions provided from the TRx Director 400 to the TRx's 300A-N.

The TRx Director 400 may include an RF interface 401 (e.g., RF transmitter and RF receiver to transmit and receive RF signals), an amplifier 402, I/O devices 403, battery 404, processor 405, memory 406, data storage 420 and vector signal recorder, analyzer and generator (VSAG) 421. In some examples, the TRx Director 400 may function as a component device in a system of distributed devices, wherein the TRx Director 400 may be operated locally or remotely.

The RF interface 401 may be a device component that may transmit and receive RF signals. The RF interface 401 may be connected to a suitable RF antenna to transmit and receive RF signals as needed. The amplifier 402 may be a device component that may increase power level of a signal, such as an RF signal. The I/O devices 403 include one or more input/output devices, such as a speaker, microphone, display, etc. The battery 404 may be a device component that may supply electrical power to power electrical devices, such as the TRx Director 400. Data storage 420 may include a solid-state drive, hard drive, or other type of data storage device that can store a library of captured recordings and waveforms. In an example, the data storage 420 may be able to store terabytes of waveform files and may be formatted as a database.

The VSAG 421 may include a vector signal analyzer (VSA) 422 and a vector signal generator (VSG) 423. The VSA 422 measures the magnitude and phase of the input signal at a single frequency within the intermediate bandwidth of the device. The VSG can make in-channel measurements, such as error vector magnitude, code domain power, and spectral flatness, on known RF signals. The VSA 422 can sample and digitize received RF signals through analog to digital converters to generate waveforms of the RF signals. The VSG 423 can create RF signals from stored waveforms with analog and digital modulation schemes for transmission into the RF environment. The VSG 423 may generate real or I/Q sampled signals for playback through digital to analog converters. The VSAG 421 may include a configurable modular platform that can connect to modules including VSA 422, VSG 423 and other components as needed.

The VSAG 421 may comprise a vector signal transceiver (VST) that combines a VSG and a VSA with an onboard FPGA performing real-time signal processing and control. The VSAG 421 may comprise a VST to achieve high bandwidth and dynamic range. The VST for example includes analog to digital converters to perform RF sampling to digitize an RF signal to generate waveforms. Also, the VST includes RF digital to analog converters to generate RF signals from waveforms. An off-the-shelf VST may be used for the VSAG 421. In an example, the mA-6A30 VST of Viavi Solutions™ may be used for the VSAG 421.

The processor 405 may execute the machine-readable instructions stored in the memory 406. It should be appreciated that the processor 405 may be a semiconductor-based microprocessor, a CPU, ASIC, FPGA, and/or other suitable hardware devices. The memory 406 may have stored thereon machine-readable instructions (which may also be termed computer-readable instructions) that the processor 405 may execute. The memory 406 may be an electronic, magnetic, optical, or other physical storage device that contains or stores executable instructions. The memory 406 may be, for example, RAM, EEPROM, or another type of suitable storage device to store the machine-readable instructions for execution by the processor 405. storage device, an optical disc, or the like. The memory 406, which may also be referred to as a computer-readable storage medium, may be a non-transitory machine-readable storage medium, where the term "non-transitory" does not encompass transitory propagating signals. It should be appreciated that the memory 406 depicted in FIG. 1D may be provided as an example. Thus, the memory 406 may or may not include additional features, and some of the features described herein may be removed and/or modified without departing from the scope of the memory 406 outlined herein.

It should be appreciated that, and as described further below, the processing performed via the instructions 407-411 on the memory 406 may or may not be performed, in part or in total, with the aid of other information and data, such as information and data provided by the backend system 100 and/or the TRx's 300A-N. Moreover, and as described further below, it should be appreciated that the processing performed via the instructions on the memory 406 may or may not be performed, in part or in total, with the aid of or in addition to processing provided by other devices, including for example, by the backend system 100 and/or the TRx's 300A-N.

In some examples, the memory 406 may store instructions, which when executed by the processor 405, may cause the processor to: monitor 407 RF signals from an RF environment; capture 408 RF signals from the RF environment; and analyze 409 captured RF signals to determine characteristics of the RF signals, including frequency and power and other characteristics discussed below. In addition, the instructions, when executed by the processor 405, may further cause the processor to generate 410 RF signals and transmit 411 the generated RF signals.

The instructions 407 may monitor (i.e., receive) RF signals from the RF environment 121. In one example, the instructions 307 may monitor RF signals received via the RF interface 401. In some examples, the instructions 407 may enable direction finding for a received signal. In particular, the instructions 407 may be enabled to utilize one or more TRx's 300A-N located at various locations to determine from where a received signal was sent. In some examples, the instructions may utilize direction finding to locate interference signals and signals of interest. In other examples, the instructions 407 may perform spectrum surveying, in that the instructions 407 may collect and catalog information from an RF environment, such as baseline information, modulation and occupancy characteristics.

The instructions 408 may capture (i.e., record) RF signals transmitted in the RF environment 121 and store the captured RF signals as waveforms. In other examples, the instructions 408 may receive captured RF signals from other devices (e.g., the TRx's 300A-N). The captured RF signals may be stored as waveforms in the data storage 420 or in remote storage in the measuring and testing backend system 100.

The instructions 409 may analyze RF signals according to one or more criteria. In these examples, the instructions 409 may analyze the captured RF signals or stored waveforms to determine one or more associated characteristics of the RF environment 121. So, in one example, the instructions 409 may analyze whether and what amount of analog voice or digital data messages are included with RF signals captured from an RF environment. In a second example, the instructions 409 may analyze the RF signals to implement deconfliction and ensure that signals generated and transmitted via the TRx Director 400 may not be interfering with signals transmitted by another device.

In some examples, the instructions 410 may generate RF signals for transmission and broadcast. In some examples, the instructions 410 may generate RF signals for transmission based on captured RF signals, such as the RF signals captured via the instructions 408. In this example, the RF signals captured via the instructions 408 may be transmitted to one or more of TRx's 300A-N for broadcast. In another example, RF signals captured at a first TRx may be received via the instructions 410, and may be transmitted (i.e., generated) for broadcast at a second TRx.

In some examples, to generate RF signals, the instructions 410 may access a library of waveforms stored in the data storage 420. In some examples, the instructions 410 may be configured to access previously loaded waveforms, which may be transmitted to generate a known alternate RF environment. In some examples, the library of waveforms may be accessed from an external system, such as the backend system 100. In other examples, the instructions 410 may modify (i.e., synthesize) one or more characteristics of RF signals to generate alternate RF signals. In some examples, the modification and the generation of the alternate RF signals may be based on an associated characteristic (e.g., as determined via the instructions 409). Furthermore, in some examples, the RF signals generated via the instructions 410 may be utilized to generate an alternate RF environment for a particular geographic location. Additionally, in some examples, the instructions 410 may synthesize original (i.e., new) RF signals not present in a native RF environment. It should be appreciated that in some examples, to generate an alternate RF environment, the instructions 410 may combine one or more of original, modified and new waveforms.

In some examples, the instructions 410 may access and implement a signal workshop software application 412 to analyze and modify (i.e., synthesize) RF signals. For example, the signal workshop software application 412 may, among other things, coordinate capture of RF signals amongst a plurality of testing devices (e.g., TRx's 300A-N), analyze the captured RF signals, and modify (e.g., amplify, attenuate, etc.) waveform characteristics associated with RF signals in order to test system capabilities. It should be appreciated that, in some examples, to generate RF environments, the instructions 410 may be configured to incorporate AI or deep learning techniques.

In some examples, the instructions 410 may access and implement a sequencer software application 413 to schedule playback of waveforms by one or more of TRx's 300A-N with the TRx Director 400. In particular, upon generation of waveforms associated with an RF environment, the sequencer software application 413 may schedule activities of one or more client testing devices to coordinate playback at predetermined frequencies, power levels, durations and/or at specific times. In this manner, the instructions 410 and the sequencer software application 413 may construct and coordinate scenarios for playback by one or more devices.

In some examples, the instructions 411 may transmit RF signals for playback. As discussed above, the instructions 411 may, in some examples, transmit authentic and/or synthesized RF signals to one or more TRx's for playback at various locations in order to create an alternate RF environment. In some examples, the transmitted RF signals may be utilized to determine if system components may tell a difference between same or similar waveforms or a difference between actual radio traffic and replayed radio traffic. In other examples, the transmitted RF signals may be utilized to generate alternate and/or augmented (e.g., denser, sparser, etc.) RF environments for testing and obfuscation purposes.

According to an example, one or more of the TRx 300 and the TRx Director 400 may include a software defined radio (SDR). An SDR is a radio in which some or all of the physical layer functions are software defined, and a radio is any kind of device that wirelessly transmits or receives RF signals. An SDR includes, among other components, an antenna, a hardware RF transmitter/receiver to communicate RF signals, and a processor executing software to perform some level of the physical baseband processing. The SDR includes a radio communication system having one or more radio components (e.g., mixers, filters, amplifiers, modulators/demodulators, detectors, etc.) that are implemented by software running on a general-purpose processor or an embedded system.

An SDR is reprogrammable to change its functionality. For example, an SDR may be programmed with different waveforms (i.e., applications) to perform different functionalities. For example, a communications operator might be carrying between 20 to 30 radios, because different radios are needed to implement different protocols to talk to different services. Instead of carrying around 20 to 30 radios, the operator may use an SDR that is reprogrammable with different waveforms that implement the required protocols to talk to different services and forces. According to an example, the waveforms may include signals for an alternate RF environment.

FIG. 1E shows an example where the measuring and testing device 500, e.g., measuring and testing device 500 shown in FIGS. 1A-B, may be connected locally to a TRx, such as TRx 300A. Also, the TRx 300A may be connected to a power amplification (PA) module 501 to increase the power level of RF signals transmitted from the TRx 300A. In an example, the measuring and testing device 500 may be connected to I/O ports of the TRx 300A and/or the PA module 501. The measuring and testing device 500, such as a laptop or tablet, may include a processor and memory to execute applications, such as the signal workshop software application 412 and/or the sequencer software application 413 or a "lite" version including some of the capabilities of those applications that allows capturing RF signals and storing waveforms and allows playback of waveforms. The measuring and testing device 500 may include I/O devices which may include a keypad and/or display for measuring and testing and playback. In some examples, a user may interact with the measuring and testing device 500 to enter information, select operations, view measurements, etc. Also, in other examples, the TRx's may be connected to the measuring and testing device 500 via network 200 to perform these operations.

In another example, the backend system 100 may store "server side" components of applications which may be used to create, edit save and load RF signal sequences. In particular, the backend system 100 may transmit information, such as files including RF signals and waveforms, to TRx Director 400 prior to execution of a playback sequence. In some examples, the signal workshop software application 412 and the sequencer software application 413 discussed above may reside on the backend system 100 and/or the device 500.

The signal workshop application 412 may include components for RF signal capture and analysis, waveform creation, waveform playback, and other operations. The signal workshop application 412 can generate user interfaces (UIs) on a display that allows a user to interact with the signal workshop application 412 and to view aspects related to the operations of the signal workshop application 412.

Figure 2:
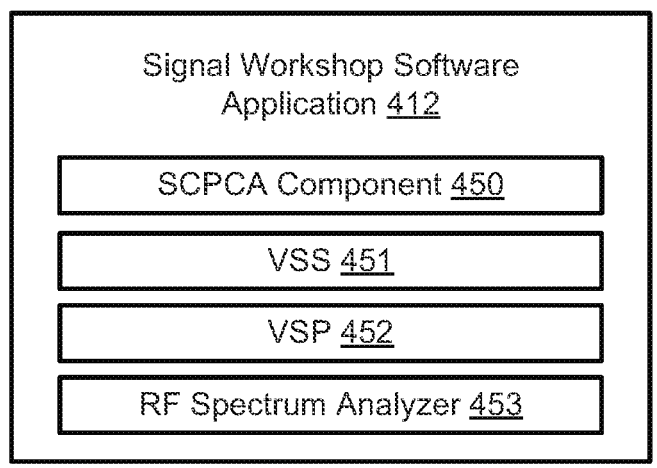
FIG. 2 shows components of a signal workshop software application, according to an example.

FIG. 2 shows examples of the components the signal workshop application 412. For example, the signal workshop application 412 may include a Signal Capture and Post-Capture Analysis (SCPCA) Component 450, Vector Signal Simulator (VSS) 451, Vector Signal Player (VSP) 452 and RF spectrum analyzer 453. The components of the signal workshop application, for example, are connected to a VST (e.g., VSAG 421) to perform their functions and operations which are described below.

The RF spectrum analyzer 453 may operate in a scanning spectrum analyzer (SSA) mode to perform frequency sweeps of a tunable RF frequency range for capturing RF signals and sampling the RF signals to create digital waveforms that can be stored in the data storage 420 for analysis, modification and playback as is further discussed below. The SSA mode provides users with the ability to analyze signals that are outside the maximum instantaneous bandwidth (IBW) of the digitizer, thus providing a wide span view of the spectrum. The SSA mode can perform frequency sweeps of any portion, or all, of the tunable RF range of the system. The SSA mode can generate plot functions including a spectrogram that displays time, frequency and power and a spectrum that displays frequency and power.

The RF spectrum analyzer 453 may also operate in mode where it can be set to a single frequency instead of scanning multiple frequencies. and does not change during the measurement.

The SCPCA component 450 is the live capture tool to capture RF signals received via an RF receiver and to provide post-capture analysis of captured RF signals and/or saved waveforms which may be captured by other devices, e.g., TRX's 300A-N. The SCPCA component 450 may interact with the RF spectrum analyzer 453 for capturing RF signals from a frequency sweep and to analyze the spectrum. In example, the TRx Director 400 may capture RF signals and may receive waveforms or recordings of RF signals captured by the TRX's 300A-N. The SCPCA Component 450 may capture RF signals received via the RF interface 401 of the TRx Director 400 and store waveforms of the captured RF signals in the data storage 420. Also, the TRx Director 400 may store waveforms of RF signals captured by the TRX's 300A-N. The SCPCA Component 450 may be used to analyze any of the stored waveforms.

One concern when capturing waveforms that are potentially massive in size is the ability to trim captured waveforms before saving to optimize file size. The SCPCA Component 450 provides the ability to trim captured waveforms based on time, such as through selected start and stop times which can be specified in time or samples, as well as resampling that allows the user to specify custom bandwidths. The user can pick any frequency range within the current captured signals to reduce file size of the stored waveforms.

Figure 3A:
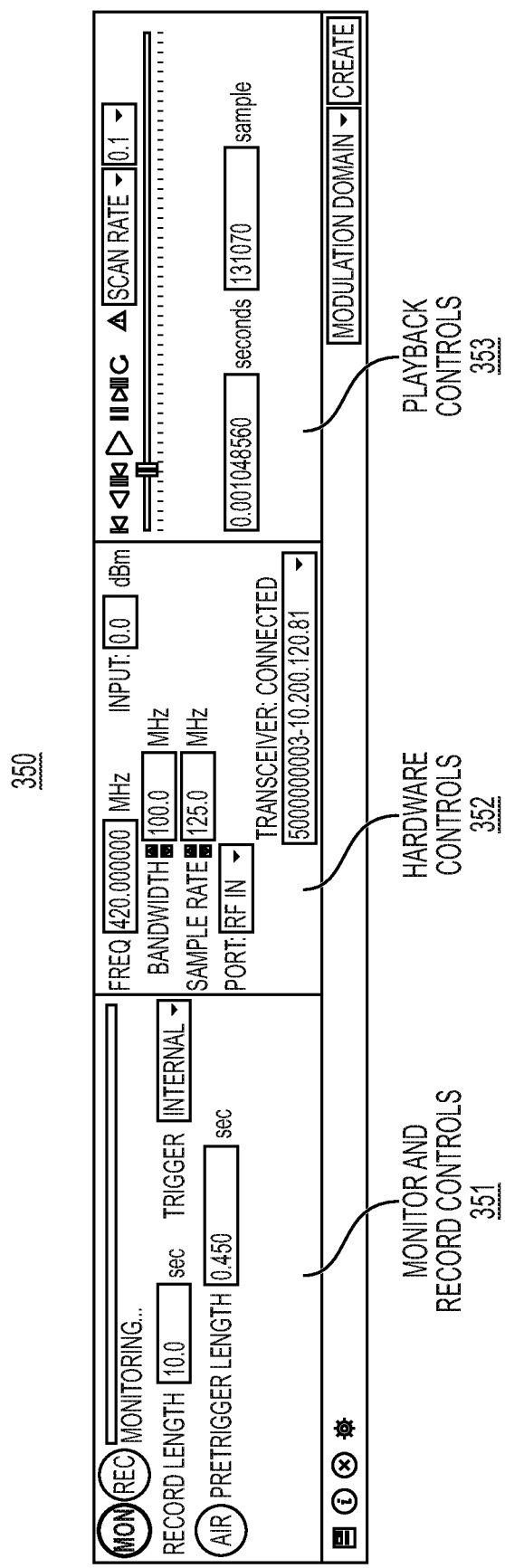

The SCPCA Component 450 can generate a UI 350 for RF signal capture and analysis, such as shown in FIG. 3A. The UI 350 may include monitor and record controls 351, hardware controls 352 and playback controls 353. The monitor and record controls 351 allow the user to select a monitor control to view received RF signals without recording or to select a record control to start recording captured signals to create stored waveforms of the captured RF signals. The monitor and record controls 351 include a monitor button and a record button. Clicking the monitor button enables a monitor mode, which performs continuous monitoring and analysis of received RF signals by alternately capturing and then displaying the results of the capture, such as in spectrum, spectrogram (waterfall), and/or time domain plots. Clicking the record button enables creating and storing a waveform which can be further viewed and analyzed as desired. A record length window allows the user to set the signal capture length, such as in seconds.

Event triggers may also be set by a user to automatic trigger recording. The event triggers may include conditions to be met to start recording, such as signals having a power level above a threshold or below a threshold, or a signal having a particular frequency or falling within a particular frequency range.

The hardware controls 352 allow the user to select certain parameters for signal capture for hardware performing the signal capture, such as hardware of the VSAG 421 shown in FIG. 1D. The hardware controls 352 allow the user to change the RF center frequency of the captured signals, the bandwidth which specifies the frequency range of the captured signals, and sample rate. Data is natively sampled at a full analog to digital converter hardware sample rate (e.g., 250M samples/sec) and can be resampled to any user-desired sample rate that is an integer division of the full ADC sample rate. An RF receiver input port of the hardware may be selected. Also, a serial number and an address, such as an Internet Protocol address, of the VST (e.g., VSAG 421) may be shown. The user may also specify a maximum total power expected for captured RF signals. This maximizes the dynamic range of the capture signal to the noise floor by optimizing the signal strength as measured by an analog to digital converter.

The playback controls 353 allow a user to move forward or backward in time for monitored RF signals that are captured or for a stored waveform. Location information including GPS coordinates, such as latitude, longitude and altitude, and a time reference clock (UTC) received from the GPS satellite may be stored for a waveform.

The UI 350 or another UI may be generated with additional capture functions that are not shown. For example, a save capture to file button allows a user to save the entire recorded signal capture to one large file and is precisely time stamped, or to trim the captured signal by time (e.g., length of time), or to trim the captured bandwidth or to resample a captured signal to a narrower bandwidth, or to trim both in time and bandwidth, which can result in a significant reduction in the size of the file saved to disk. These file management options are very useful in trying to control file sizes and can also be used to trim existing captured files which may already be stored as waveforms. Using these tools can also speed file transfer times to and from other devices.

The UI 350 may include a section (not shown) that can display plots for the signal being captured or for a signal that was previously captured and stored as a waveform. These plots allow the user to analyze the signal as it is being captured or allows the user to analyze previously captured and stored signals. Examples of the plots may include spectrum, spectrogram, and time plots. For example, the RF spectrum analyzer 453 provides data for the plots and the plots may be displayed in the UI 350. For example, a spectrum plot may include a power versus frequency representation of signal data. An event trigger can be used to detect near real time events coming into the system and trigger a recording, such as when power rises above or falls below a threshold. A spectrogram plot can display a historical representation of spectral content over time, such as frequency (x axis) versus amplitude (color) vs time (y axis). A time domain plot may also be displayed.

As discussed above, the signal workshop software application 412 may provide various analytical functionalities including, but not limited to, live monitoring and post-analysis display and processing, interactive spectrum/spectrogram/time domain plots, strip charting and data logging, and modulation domain analysis. In some examples, the signal workshop software application 412 may also provide AM/FM/PM analysis and demodulation functions, channel power and adjacent channel power radio (ACPR) analysis functions, burst analysis and spectrum allocation table(s) (SATs). Furthermore, in some examples, the signal workshop software application 412 may also provide ASK (amplitude-shift keying), FSK (frequency-shift keying), PSK (phase-shift keying), and QAM (quadrature amplitude modulation) analysis functions. In addition, in some examples, the signal workshop software application 412 may also provide various other analysis and functions, including modulation domain (i.e., signal classification) analysis, analog demodulation, digital demodulation analysis, pulse analysis, environmental signal parameterization, adjacent channel power ration (ACPR) measurement and remote API (application programming interface) control as well.

The VSS 451 is another component of the signal workshop application 412 shown in FIG. 2. VSS 451 is a waveform creation tool capable of creating a single waveform or reproducing an entire spectral environment, including mixed signals, realistic impairments, and additive recorded signals.

The VSS 451 computes the RF spectrum and Complementary Cumulative Distribution Function (CCDF), which are plotted to provide a means to visually validate created signals and are stored along with primary file data. Signal files, e.g., waveforms, are created and stored. The VSS 451 is used to generate real or I/Q sampled signals that are suitable for playback through a Digital Analog Converter (DAC). A range of waveform types can be generated, such as FSK, PSK, or QAM communication signals and tone comb or NPR test signals. Each signal type is configured using a waveform editor that contains parameters specific to each signal.

The VSS 451 is capable of generating complex multi-carrier, multi-standard signal environments, including one or more signal captures, interference sources, and noise, to provide realistic electromagnetic environments. The VSS 451 can re-sample complex waveforms, combining signal with different sample rates and file lengths, which allows users to construct complex, realistic electromagnetic environments.

Figure 3B:
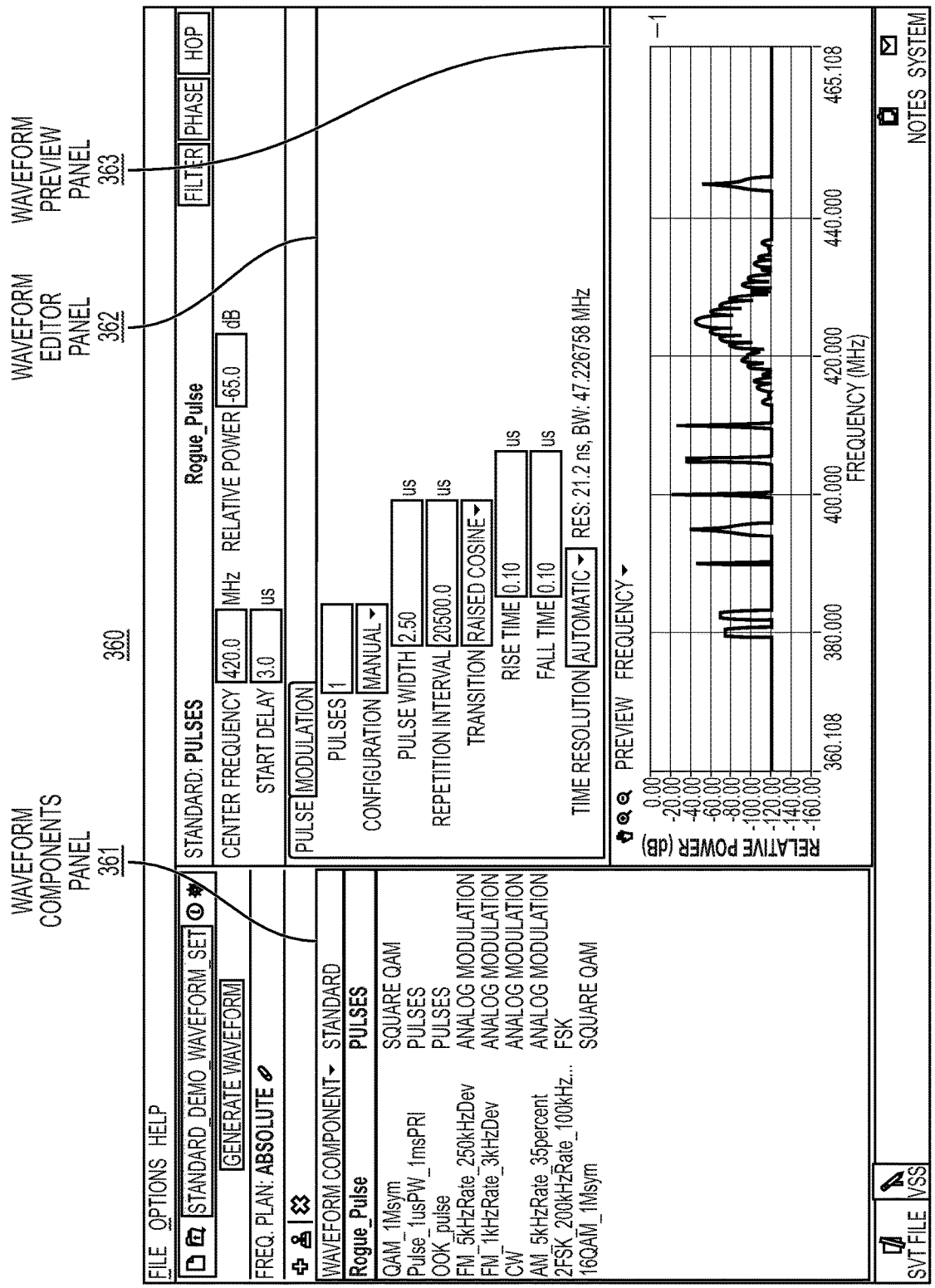

A UI 360 generated by VSS 451 is shown in FIG. 3B and is used for creating signals in single and multiple carrier formats with full control of RF parameters and embedded data. The UI 360 includes a waveform components panel 361 that contains controls that are used to add, duplicate or delete waveform components from a signal. In the example shown, a pulse component is selected to be added to the signal.

There are several signal types and standards available in VSS 451 depending on the system configuration. For example, Analog and Digital modulation types, such as AM, FM, PM, FSK, PSK, and QAM, impairments such as AWGN, NPR, and Tone Combs, various communication standards, and the ability to import IQ or real samples. The waveform editors supply the controls for editing these signals. A waveform editor panel 362 allows the user to configure and generate different types of waveforms, as desired. The user can select characteristics of the waveform, such as center frequency, bandwidth, power, start delay, waveform type, modulation type, etc. In this example, the waveform includes repeated pulses, and characteristics of the pulses may be selected. A waveform preview panel 363 provides a preview of a composite waveform after the waveform is generated.

The VSP 452 is another component of the signal workshop application 412 shown in FIG. 2. The VSP 452 controls hardware playback of waveforms. The VSP 452 is capable of streaming large files directly from data storage or loading and playing smaller waveforms from local memory. The VSP 452 supports simultaneous playback on multiple Vector Signal Transceivers (VSTs), which may include VSTs for the TRx Director 400 and for the TRx's 300A-N. Each connected VST can be independently configured using separate controls and settings. Separate VST settings and controls allows each VST to be configured to playback unique waveforms, or the same file independently.

A UI 370, shown in FIG. 3C, for VSP 452 may be generated with VSP player controls and settings. In this example, the UI 370 includes VSP player controls and settings for multiple players in panels 371 and 372. The VSP player controls and settings allow a user to select the VST for each player, the waveform file to be played by each player, the RF center frequency and RF power level for the playback, the sample rate, triggers, playback mode (e.g., continuous loop or end playback when player reaches end of the waveform file), and playback controls. Although not shown, a preview window may show a representation of the waveform file being played.

The sequencer software application 413 is capable of sequencing a series of RF events. RF events may include playing waveforms on a plurality of devices in any order. RF events may also include monitoring and recording RF signals. Sequencing a series of RF events may include scheduling monitoring, recording and playback functions in "parallel" on a plurality of devices in any order. A sequence refers to the scheduled execution of RF events on one or more devices. The devices may include one or more of the devices shown in the system environment 1000. The sequencer software application 413 may schedule, coordinate and/or control playback of waveforms on the one or more devices. The sequencer software application 413 may interface with the signal workshop software application 412 to coordinate the RF activities of TRx's 300A-N with activities of the TRx Director 400, including playback of waveforms. In some examples, to schedule, coordinate and/or control activities of one or more devices as described, the sequencer software application 413 may receive one or more files (e.g., waveform files) from another device (e.g., the backend system 100). The sequencer software application 413 can control multiple RF channels to perform monitoring, recording, and playback functions across the devices. It can include a software tool that can generate a UI that visualizes the overall scenario along with detailed control in a time-based environment. Through the UI, a user can identify waveforms that are to played during playback, and through the UI, a user can easily schedule when each waveform is to be played, which can include sequential and/or parallel playback of waveforms, and specify a device to play each waveform.

The sequencer software application 413 may be hosted on TRx Director 400 or a separate device, such as a tablet, etc., that would function as a master, and can control other TRx Director 400 and/or TRx's 300A-N. The sequencer software application 413 can operate as a supervisory role over multiple instances of the signal workshop application 412 which may include instances on the TRx Director 400 and the TRx's 300A-N.

In an example, the sequencer may include a server-side software application that will include a UI for creating, editing, saving and loading sequences, and a client-side software residing on one or more TRx Directors that are under sequencer control. The server-side software may be installed on the backend system 100, a personal computer or another TRx Director. The client-side software may reside on TRx Director 400 and may interface with the signal workshop application 412.

In an example, prior to the first execution of a sequence, files needed, including waveforms, are stored on the server side. The server side can transmit the waveforms for the sequence to TRx Director 400 and/or TRx's 300A-N but will check for the correct version prior to sending. To save bandwidth, in an example, files are transferred only if needed. Also, the server side may have the ability to delete files on the client side to maintain data security. In another example, the TRx Director 400 creates one or more of the waveforms for the sequence and transmits the waveforms to the corresponding TRx's 300A-N and/or the server side. The user will have the option to configure a sequence to start via manual execution (push play) or at a specific time. Each client system will be configured to the same clock source, and the server-side software will compile the sequence with the appropriate time for each event to be executed on the client. It is expected that there will be a slight delay between a manual sequence execution and the actual start of execution to allow for server and client synchronization. When started based on an absolute time, it is expected that the sequence will start precisely at that time. The start time will be settable with 1 second resolution or other resolution.

In some examples, the sequencer software application 413 may enable generation of waveforms associated with an RF environment along with scheduling of activities of one or more devices in order to coordinate playback at predetermined frequencies, power levels, durations and/or at specific times. The sequencer software application 413 may enable monitoring, recording and playback functions in "parallel", in that it may implement sequencing in a time-based environment, wherein various devices may be tasked to perform specific tasks at specific times and coordinate their associated RF signal playback to generate an alternate RF environment. Individual waveforms may be assigned to individual devices, e.g., VSTs, for playback of the scenario.

To enable the sequenced monitoring, recording and/or playback, one or more devices, such as the TRx Director 400 and the backend system 100, may be synchronized. In some examples, to synchronize activities of associated devices, the sequencer software application 413 may utilize time-of-day (TOD) execution or relative-time execution (e.g., "event 21 executes 100 ms after event 20"). Devices may be synchronized to the same clock source for playback of a sequence.

In some examples, the sequencer software application 413 may include a sequencer UI that may enable a user to, among other things, add or remove devices (e.g., VSTs of TRx's 300A-N and/or TRx Director 400), enable or disable devices, add play or record events, gather status information and start or stop of a sequence. In some examples, editing of details of an event (e.g., a waveform filename) or device (e.g., device name, device type) may be enabled via user selection, wherein upon selection, a dialog window corresponding to the event or device component may open.

In some examples, the sequencer UI of the sequencer software application 413 may display detailed and overall "views" of a scenario. In some examples, the detailed view may correspond in time with the overall view, and updating a first (e.g., detailed) view may result in corresponding updating of a second (e.g., overall) view. So, in one example, the individual scenarios may be 5-minute blocks of an "overall" 1-hour view. The sequencer UI may enable a waveform file to be "dragged and dropped" onto a timeline. Upon completion of the scenario, the sequencer UI may enable a movable window (of time) as the scenario is played, which may offer the user an ability to visualize the overall scenario timeline and zoom in for execution details relating for each component over time and in relation to other components.

Figure 3D:
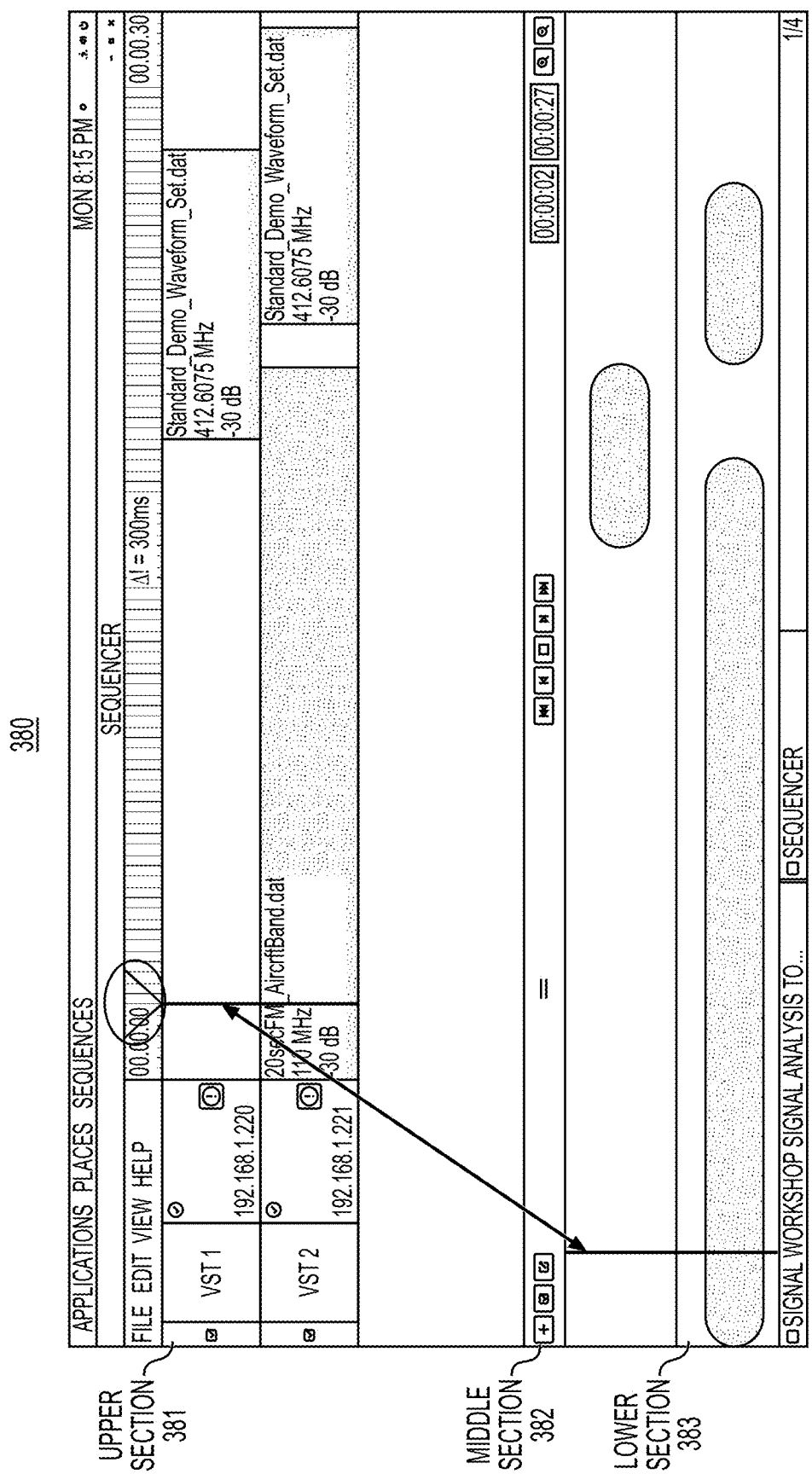

The sequencer software application 413 allows a user to create, edit and save sequences. A sequence can include waveforms and criteria for playback of the waveforms which may be performed by a plurality of distributed devices. FIG. 3D shows an example UI 380 comprising a sequencer UI that may be generated by the sequencer software application 413.

The UI 380 includes upper section 381, middle section 382 and lower section 383. The upper section 381 is a sequence scenario design area, and also provides a detailed view of the overall scenario. The middle section 382 includes scenario playback controls for moving forward and backward through the scenario. The lower section 383 provides the total or global view of the scenario. The views displayed in the upper section 381 and the lower section 383 are both of the overall scenario but the views may be at different time granularities. For example, the upper section 381 may show five-minute segments and the lower section may show one-hour segments of the scenario, but the views are synchronized. For example, the double-headed arrow, which is shown for clarity but not be in the UI 380, shows that the views are synchronized as the scenario is moved forwards or backwards using the controls in the middle section 382. In this example, the overall scenario is 1 hour long, while the upper section 381 shows 5 minutes of the overall scenario. The windows in the upper section 381 and the lower section 383 scroll from right to left as time continues to move forward.

The synchronized windows in the upper section 381 and the lower section 383 allow the user to know the correlation between the two views. During editing, the user can move the play head (line shown for clarity) in one view and have the information update in both views. The user can also manually position the play head and play the sequence starting at the selected time. The user can visualize the overall timeline and can view it in greater detail to see what each component is doing in time and in relation to other components. The views can provide a preview of the scenario as it plays out.

The sequence scenario design area in the upper section 381 allows a user to create, edit and save scenarios. For example, menus not shown, allow a user to select VSTs and assigns bands of interest for generating (i.e., waveform playback), monitoring, or recording by each VST. In this example, different waveforms are assigned to each VST for playback at specified times. Also, conflicts can be highlighted. An example of a conflict is assigning two different waveforms for playback at the same time by the same VST.

The UI 380 can be used to assign criteria for playback of waveforms and criteria for monitoring and recording. Examples of the criteria for the playback may include identification of the waveforms, such as filenames, identification of a particular device for playback of each waveform, such as an IP address, serial number, etc., of particular VSTs of the TRx's 300A-N and the TRx Director 400, a time to play each waveform (e.g., the TRx's 300A-N and the TRx Director 400 may be synchronized to the same clock source, such as a GPS clock source or a network time protocol clock source), length of time to playback of each waveform, whether to repeat and how many times to repeat playback of each waveform, and a frequency and power level for the playback of each waveform. The sequencer software application 413 may be used to determine the criteria for playback, which can be selected by a user. The criteria for monitoring and recording may include similar criteria as the criteria for playback. The scenario can be saved and includes the criteria described above. Instructions can be sent to the devices specified in the scenario to cause execution of the scenario by the devices. The instructions may include the criteria discussed above and waveforms for playback. The devices may include VSAs and VSGs to perform playback, monitoring and recording as required by the scenario.

Figure 4:
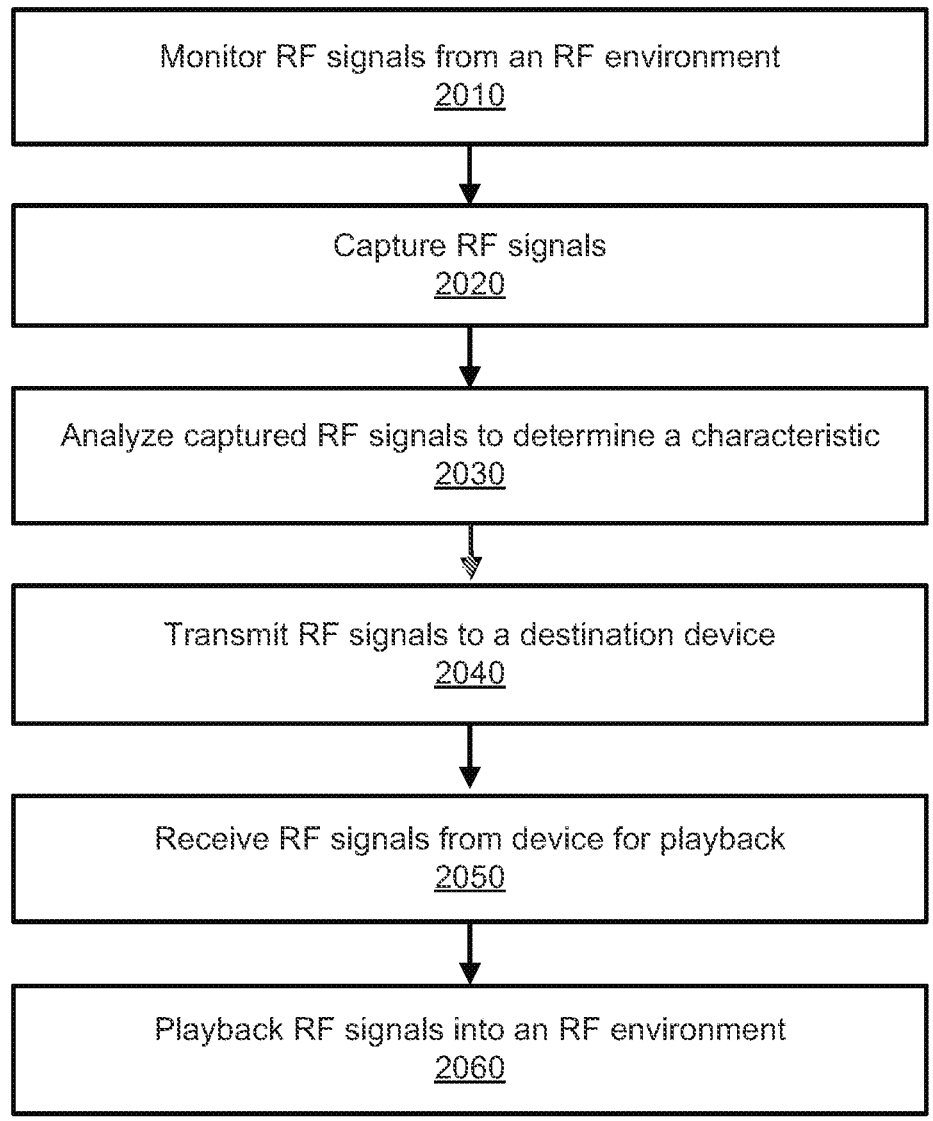
FIGS. 4-6 illustrate methods for monitoring, analyzing and generating RF environments utilizing distributed devices, according to examples.

FIG. 4 illustrates a method for capturing, generating and transmitting RF signals, according to an example. The method 2000 is primarily described as being performed by the TRx 300 shown in FIG. 1C. However, the method 2000 may be executed or otherwise performed by other systems, or a combination of systems. Also, each block shown in FIG. 4 may further represent one or more processes, methods, or subroutines, and one or more of the blocks may include machine-readable instructions stored on a non-transitory computer-readable medium and executed by a processor or other type of processing circuit to perform one or more operations described herein.

At 2010, the processor 305 may monitor RF signals from a RF environment. In some examples, the processor 305 may monitor RF signals via the transceiver 312, and may specifically monitor ("look") for signals of interest or for interference signals.

At 2020, the processor 305 may capture RF signals associated with an RF environment, such as the RF environment 121. In some examples, the processor may store the captured RF signals on a memory device, such as the memory 306, for analysis and for transmission to another device, such as the TRx Director 400.

At 2030, the processor 305 may analyze the captured RF signals to determine an associated characteristic. In some examples, the processor 305 may analyze captured RF signals according to one or more criteria to determine one or more associated characteristics At 2040, the processor 305 may transmit RF signals to a destination device. That is, in some examples, the processor 305 may transmit RF signals captured natively in an RF environment to another device, such as the TRx Director 400, for analysis and/or modification.

At 2050, the processor 305 may receive RF signals from a device, such as the TRx Director 400, for playback. So, in some examples, upon transmitting RF natively captured in an environment to another device for analysis, the processor 305 may receive RF signals that may be provided for a particular objective.

At 2060, the processor 305 may playback received RF signals into a RF environment to generate an alternate RF environment, such as the alternate RF environment 122. In some examples, the processor 305 may receive and playback native (i.e., authentic) RF signals captured at another TRx to be replayed for testing purposes. In other examples, the processor 305 may receive and playback augmented RF signals that may generate an alternate RF environment.

Figure 5:
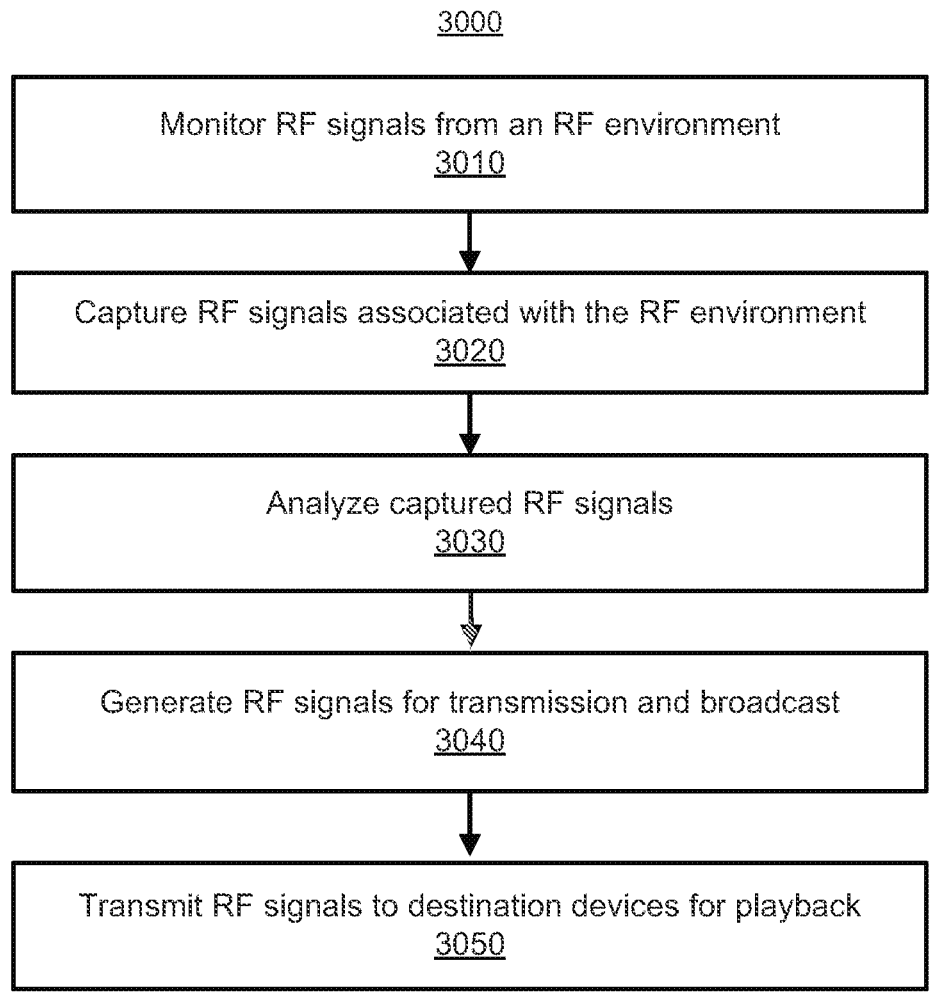

FIG. 5 illustrates a method 3000 for capturing, generating and transmitting RF signals, according to an example. The method 3000 is primarily described as being performed by the TRx Director 400 shown in FIG. 1D, but the method 3000 may be executed or otherwise performed by other systems, or a combination of systems. It should be appreciated that, in some examples, the method 3000 may be configured to incorporate artificial intelligence (AI) or deep learning techniques, as described above. Also, the method 3000 illustrated in FIG. 5 is provided by way of example, as there may be a variety of ways to carry out the method described herein. Each block shown in FIG. 35 may further represent one or more processes, methods, or subroutines, and one or more of the blocks may include machine-readable instructions stored on a non-transitory computer-readable medium and executed by a processor or other type of processing circuit to perform one or more operations described herein.

At 3010, the processor 405 may monitor RF signals from an RF environment, such as the RF environment 121. In some examples, the processor 405 may implement direction finding and spectrum surveying to gather information relating to the RF environment for the location.

At 3020, the processor 405 may capture RF signals associated with the RF environment. In some examples the processor 405 may capture RF signals associated with a first location, and may receive captured RF signals from another device, such as one or more of TRx's 300A-N, located at other locations.

At 3030, the processor 405 may analyze captured RF signals. In some examples, the processor 405 may analyze the captured RF signals, which may have been captured via one or more devices, to determine one or more associated characteristics. In one example, the processor 405 may analyze whether and what amount of analog voice or digital data messages are included with RF signals captured from the RF environment.

At 3040, the processor 405 may generate RF signals for transmission and broadcast. In other examples, the instructions 410 may modify (i.e., synthesize) an aspect relating to RF signals to generate alternate RF signals for an alternate RF environment, such as alternate RF environment 122. In some examples, the generation of the alternate RF signals may be based on an associated characteristic. Moreover, in some examples, to generate the alternate RF environment, the processor 405 may combine one or more of original, modified and new waveforms. Furthermore, in some examples, the processor 405 may schedule activities of one or more client testing devices (e.g., TRx's 300A-N) and system testing devices (e.g., TRx Director 400) to coordinate playback of RF signals at predetermined frequencies, power levels, durations and/or at specific times.

At 3050, the processor 405 may transmit RF signals to destination devices, such as TRx's 300A-N, for playback. That is, in some examples, the processor 405 may transmit RF signals to one or more devices for one or more purposes. In some examples, the RF signals transmitted for playback may be utilized to determine if system components may tell a difference between same or similar waveforms or a difference between actual radio traffic and replayed radio traffic. In other examples, the RF signals transmitted for playback may be utilized to generate alternate and/or augmented (e.g., denser, sparser, etc.) RF environments for testing and obfuscation purposes.

Figure 6:
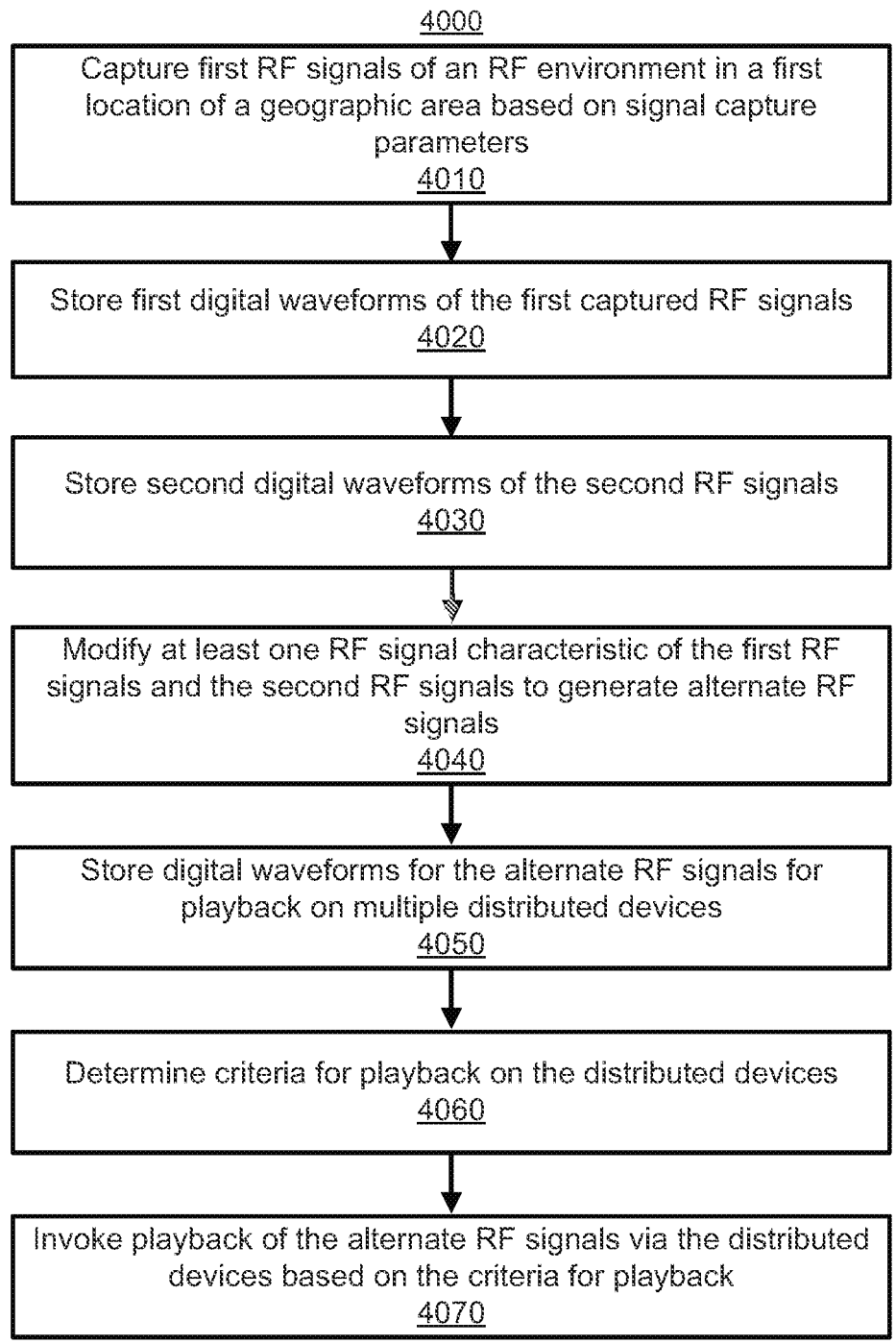

FIG. 6 illustrates a method 4000 for capturing, generating and transmitting RF signals and coordinating a plurality of distributed devices, such as TRx's 300A-N, for playback of an alternate RF signals to create an alternate RF environment, according to an example. The method 4000 is primarily described as being performed by the TRx Director 400 shown in FIG. 1D, but the method 4000 may be executed or otherwise performed by other devices, or a combination of devices. Each block shown in FIG. 6 may further represent one or more processes, methods, or subroutines, and one or more of the blocks may include machine-readable instructions stored on a non-transitory computer-readable medium and executed by a processor or other type of processing circuit to perform one or more operations described herein.

At 4010, the processor 405 captures first RF signals of an RF environment in a first location of a geographic area based on signal capture parameters. For example, the TRx Director 400 uses hardware, including VSAG 421 which may comprise a vector signal transceiver, to capture RF signals, referred to as first RF signals, in the RF environment 121. Frequency sweeps may be performed to capture the first RF signals. Also, TRx's 300A-N may also capture RF signals, referred to as second RF signals, in the RF environment 121. The TRx Director 400 and the TRx's 300A-N are located at different locations in the geographic location 120 of the RF environment 121 to capture RF signals that can be received at different locations within the geographic location 120. Signal capture parameters by way of example may include frequency range, signal strength, start and stop time of recording, signal trigger parameters that trigger signal capture which may be based on signal strength thresholds.

At 4020, the processor 405 stores first digital waveforms of the first captured RF signals. For example, the VSAG 421 can generate waveforms from received RF signals, and the waveforms are stored in data storage 420.

At 4030, the processor 405 stores second digital waveforms of the second RF signals. In an example, one or more of the TRx's 300A-N capture the second RF signals and generate second waveforms of the second RF signals. The second waveforms are transmitted to the TRx Director 400 and may be stored in the data storage 420 for further analysis and modification. Also, waveforms may be transmitted to and stored at the measuring and testing backend system 100, and then transmitted to the TRx Director 400 and/or TRx's 300A-N.

At 4040, the processor 405 modifies at least one RF signal characteristic of the first RF signals and the second RF signals to generate alternate RF signals. Examples of RF signal characteristics may include center frequency, bandwidth, power, start delay, waveform type, modulation type, etc.

At 4050, the processor 405 stores digital waveforms for the alternate RF signals for playback on distributed devices, such as one or more of the TRx's 300A-N and/or the TRx Director 400 also. Playback may include generating the alternate RF signals from waveforms representing the alternate RF signals, such as performed by the VSAG 421, and transmitting the alternate RF signals in the RF environment to create the alternate RF environment 122.

At 4060, the processor 405 determines criteria for the playback. The playback may include playback of a sequence of waveforms from different devices (e.g., TRX's 300A-N and TRx Director 400) at stated times. Examples of the criteria for the playback may include identification of the waveforms, such as filenames, identification of a particular device for playback of each waveform, such as an IP address, serial number, etc., of particular VSTs of the TRx's 300A-N and the TRx Director 400, a time to play each waveform (e.g., the TRx's 300A-N and the TRx Director 400 may be synchronized to the same clock source, such as a GPS clock source or a network time protocol clock source), length of time to playback of each waveform, whether to repeat and how many times to repeat playback of each waveform, and a frequency and power level for the playback of each waveform. The sequencer software application 413 may be used to determine the criteria for playback, which can be selected by a user.

At 4070, the processor 405 invokes playback of the alternate RF signals via the TRx's 300A-N and/or the TRx Director 400 based on the criteria for playback. For example, the TRx Director 400 transmits corresponding waveforms and instructions including the corresponding criteria for playback to each of the TRx's 300A-N. Also, the waveforms may be transmitted to and stored at the measuring and testing backend system 100, and then transmitted to the TRx Director 400 and/or TRx's 300A-N. Also, the TRx Director 400 can playback waveforms for the alternate RF environment based on specified criteria for playback. The TRx's 300A-N and the TRx Director 400 execute the playback of the waveforms as instructed to create the alternate RF environment.

The TRx Director 400 may also generate new waveforms for the alternate RF environment. For example, the VSS 451 and/or the VSP 452 described above with respect to FIG. 2 may be used to create waveforms from digital bit files without having to modify existing waveforms. RF signals generated from these new waveforms may be transmitted in the RF environment by one or more of the TRx's 300A-N and the TRx Director 400 to create the alternate RF environment.

In addition to the operations discussed above, the TRx Director 400 and/or the TRx's 300A-N may map of an area of operation, including determining the location of signal sources based on direction finding for received RF signals. For example, the operator can direction find signals of interest and display the line of bearing for the signals. The operator can identify and demodulate the signals during the direction find. A signal strength heat map can be displayed based on the direction find to pinpoint locations of signal sources.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims and their equivalents in which all terms are meant in their broadest reasonable sense unless otherwise indicated.

The invention claimed is:

1. A measuring and testing director device comprising:
   a radio frequency (RF) interface connectable to an antenna to transmit and receive RF signals;
   a data storage to store waveforms of sampled RF signals;
   a vector signal analyzer;
   a vector signal generator;
   a processor; and
   a memory storing machine-readable instructions, which when executed by the processor, cause the processor to:
   perform frequency sweeps via the vector signal analyzer to capture first RF signals of an RF environment in a first location of a geographic area of the RF environment based on signal capture parameters;
   store first digital waveforms of the first RF signals in the data storage;
   receive second digital waveforms of second RF signals of the RF environment from a plurality of distributed devices located at a plurality of different locations in the geographic area of the RF environment, wherein the plurality of distributed devices respectively capture the second RF signals of the RF environment from the different locations in the geographic area and send the second digital waveforms of the second RF signals to the measuring and testing director device;

determine RF signal characteristics of the first RF signals and the second RF signals;

modify at least one of the RF signal characteristics of the first RF signals and the second RF signals to generate alternate RF signals;

store digital waveforms for the alternate RF signals for playback on the plurality of distributed devices;

determine criteria for the playback of the alternate RF signals; and invoke the playback of the alternate RF signals on the plurality of distributed devices via the vector signal generator of the measuring and testing director device based on the criteria for the playback.

2. The measuring and testing director device of claim 1, wherein to invoke playback of the alternate RF signals from the plurality of distributed devices, the processor is to:

transmit a plurality of the digital waveforms for the alternate RF signals to the plurality of distributed devices; and transmit instructions for the playback to the plurality of distributed devices based on the criteria for the playback to coordinate the playback of the alternate RF signals by the plurality of distributed devices.

3. The measuring and testing director device of claim 2, wherein the instructions for the playback identify a waveform of the plurality of the digital waveforms for the alternate RF signals to be played by each of the plurality of distributed devices, a time to playback each waveform, and a frequency and a power level for the playback of the waveform.

4. The measuring and testing director device of claim 1, wherein the machine-readable instructions, which when executed by the processor, cause the processor to:

receive user input specifying RF events to be performed by a plurality of devices of the plurality of distributed devices;

generate a scenario specifying a device of the plurality of devices to perform each RF event and an indication of when each RF event is to be performed; and transmit instructions for executing the scenario by the plurality of devices.

5. The measuring and testing director device of claim 4, wherein the RF events comprise at least one of generating, monitoring and recording of RF signals.

6. The measuring and testing director device of claim 1, wherein the signal capture parameters comprise at least one of:

frequency range, power level, start and stop time of recording, and conditions that trigger signal capture if met.

7. The measuring and testing director device of claim 1, wherein the RF signal characteristics comprise at least one of center frequency, power level, and modulation type.

8. The measuring and testing director device of claim 1, further comprising:

a vector signal simulator executed by the processor to create a new waveform for new RF signals based on a specified modulation type, impairment, imported IQ samples or real IQ samples, a center frequency and a power level.

9. The measuring and testing director device of claim 8, wherein the machine-readable instructions, which when executed by the processor, cause the processor to:

transmit instructions to at least one of the plurality of distributed devices to playback the new waveform.

10. The measuring and testing director device of claim 1, further comprising a vector signal player executed by the processor to interface with the vector signal generator for waveform playback according to parameters specifying an RF center frequency and an RF power level for the waveform playback, a sample rate, and when to perform the waveform playback.

11. The measuring and testing director device of claim 1, wherein each distributed device of the plurality of distributed devices includes a processor to:

monitor a set of RF signals from the RF environment;

record the set of RF signals; and generate a second set of RF signals from waveforms stored at the distributed device.

12. A method of creating an alternate radio frequency (RF) environment, the method comprising:

capturing, by a processor of a measuring and testing director device, first RF signals of an RF environment via a hardware vector signal transceiver in a first location of a geographic area of the RF environment based on signal capture parameters;

storing, in a data storage of the measuring and testing director device, first digital waveforms of the first RF signals;

receiving, by the measuring and testing director device, second digital waveforms of second RF signals of the RF environment from a plurality of distributed devices located at different locations in the geographic area of the RF environment, wherein the plurality of distributed devices respectively capture the second RF signals of the RF environment from the different locations in the geographic area and send the second digital waveforms of the second RF signals to the measuring and testing director device;

modifying, by the processor of the measuring and testing director device, at least one RF signal characteristic of the first RF signals and the second RF signals to generate alternate RF signals;

storing, in the data storage of the measuring and testing director device, digital waveforms for the alternate RF signals for playback on the plurality of distributed devices;

determining, by the processor of the measuring and testing director device, criteria for the playback of the alternate RF signals; and invoking, by the processor of the measuring and testing director device, the playback of the alternate RF signals on the plurality of distributed devices based on the criteria for the playback.

13. The method of claim 12, wherein the invoking of the playback comprises:

transmitting the digital waveforms for the alternate RF signals to the plurality of distributed devices; and transmitting instructions to specify which of the plurality of distributed devices is to play each of the digital waveforms for the alternate RF signals and a time to playback each of the digital waveforms for the alternate RF signals.

14. The method of claim 13, wherein the instructions specify a frequency and a power level for the playback of each of the digital waveforms for the alternate RF signals.

15. The method of claim 12, comprising:
receiving user input specifying RF events to be performed by a plurality of devices of the plurality of distributed devices;
generating a scenario based on the user input, wherein the scenario specifies a device of the plurality of devices to perform each RF event and an indication of when each RF event is to be performed; and
transmit instructions for executing the scenario by the plurality of devices.

16. The method of claim 15, wherein the RF events comprise at least one of generating, monitoring and recording of RF signals.

17. The method of claim 12, wherein the signal capture parameters comprise at least one of:
frequency range, power level, start and stop time of recording, and conditions that trigger signal capture if met.

18. The method of claim 12, wherein the RF signal characteristics comprise at least one of center frequency, power level, and modulation type.

19. A system for generating an alternate radio frequency (RF) environment, the system comprising:
a measuring and testing director device; and
a plurality of distributed devices located at different locations in a geographical area of an RF environment,
wherein the measuring and testing director device comprises:
a data storage to store waveforms of sampled RF signals;
a vector signal transceiver;
a processor; and
a memory storing machine-readable instructions, which when executed by the processor, cause the processor to:
capture first RF signals of the RF environment based on signal capture parameters;
store first digital waveforms of the first RF signals in the data storage;
receive second digital waveforms of second RF signals of the RF environment from the plurality of distributed devices, wherein the plurality of distributed devices respectively capture the second RF signals of the RF environment from the different locations in the geographic area and send the second digital waveforms of the second RF signals to the measuring and testing director device;
determine RF signal characteristics of the first RF signals and the second RF signals;
modify at least one of the RF signal characteristics of the first RF signals or the second RF signals to generate alternate RF signals;
store digital waveforms for the alternate RF signals for playback on the plurality of distributed devices;
determine criteria for the playback of the alternate RF signals; and
invoke the playback of the alternate RF signals on the plurality of distributed devices based on the criteria for the playback.

20. The system of claim 19, wherein the criteria for the playback comprises an identifier of a distributed device to play each of the digital waveforms for the alternate RF signals and a time to playback each of the digital waveforms for the alternate RF signals.

* * * * *